United States Patent
Nagashima

(10) Patent No.: US 9,928,452 B2
(45) Date of Patent: Mar. 27, 2018

(54) IMAGE DECODING APPARATUS AND METHOD THEREFOR

(71) Applicant: CANON KABUSHIKI KAISHA, Tokyo (JP)

(72) Inventor: Takayuki Nagashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 15/169,993

(22) Filed: Jun. 1, 2016

(65) Prior Publication Data

US 2016/0358046 A1 Dec. 8, 2016

(30) Foreign Application Priority Data

Jun. 5, 2015 (JP) .................................. 2015-115036
Apr. 7, 2016 (JP) .................................. 2016-077580

(51) Int. Cl.
| | |
|---|---|
| *G06K 9/46* | (2006.01) |
| *G06K 15/02* | (2006.01) |
| *H04N 1/41* | (2006.01) |
| *H04N 1/64* | (2006.01) |

(52) U.S. Cl.
CPC ............. *G06K 15/184* (2013.01); *H04N 1/41* (2013.01); *H04N 1/642* (2013.01)

(58) Field of Classification Search
CPC .......... H04N 1/41; H04N 1/642; H04N 19/44; G06K 15/184
USPC ................................................. 382/232, 233
See application file for complete search history.

(56) References Cited

U.S. PATENT DOCUMENTS

| | | | | |
|---|---|---|---|---|
| 5,455,680 A | * | 10/1995 | Shin ......................... | G06T 9/40 |
| | | | | 375/E7.088 |
| 5,883,976 A | | 3/1999 | Ohsawa | |
| 8,229,235 B2 | * | 7/2012 | Kim ..................... | H04N 19/176 |
| | | | | 382/234 |
| 8,392,596 B2 | * | 3/2013 | Kamay ................ | H04N 19/503 |
| | | | | 709/217 |
| 2011/0075943 A1 | * | 3/2011 | Minami ................... | H04N 1/41 |
| | | | | 382/233 |

* cited by examiner

*Primary Examiner* — Daniel Mariam
(74) *Attorney, Agent, or Firm* — Rossi, Kimms & McDowell LLP

(57) ABSTRACT

This invention decodes image data without overwriting the decompression result of the first image data by that of the second image data when the first image data compressed by the first method and the second image data compressed by the second method coexist. To do this, when decoding the image data in which the first image data compressed by the first method and the second image data compressed by the second method different from the first method coexist, a lossy-decoding unit decodes the first image data. Based on boundary information indicating a compression region compressed by the second method, a lossless-decoding unit selectively outputs pixel data decoded by the lossy-decoding unit or pixel data obtained by decoding the second image data of the compression region.

21 Claims, 19 Drawing Sheets

FIG. 4

| BOUNDARY COUNT E | | 5 |
|---|---|---|
| HEADER OF BOUNDARY 0 | REGION COLOR | 0xFF0000 |
| | START Y-POSITION | 0 |
| | ENABLING X-POSITION | 0 |
| | END Y-POSITION | 9 |
| | DISABLING X-POSITION | 2 |
| HEADER OF BOUNDARY 1 | REGION COLOR | 0x00FF00 |
| | START Y-POSITION | 0 |
| | ENABLING X-POSITION | 10 |
| | END Y-POSITION | 11 |
| | DISABLING X-POSITION | 15 |
| HEADER OF BOUNDARY 2 | REGION COLOR | 0x0000FF |
| | START Y-POSITION | 2 |
| | ENABLING X-POSITION | 9 |
| | END Y-POSITION | 9 |
| | DISABLING X-POSITION | 10 |
| HEADER OF BOUNDARY 3 | REGION COLOR | 0x888888 |
| | START Y-POSITION | 7 |
| | ENABLING X-POSITION | 12 |
| | END Y-POSITION | 13 |
| | DISABLING X-POSITION | 12 |
| HEADER OF BOUNDARY 4 | REGION COLOR | 0x000000 |
| | START Y-POSITION | 11 |
| | ENABLING X-POSITION | 0 |
| | END Y-POSITION | 13 |
| | DISABLING X-POSITION | 3 |
| LOCUS DATA OF ENABLING BOUNDARY OF BOUNDARY 0 | | 0,0,0,0,0,+1,+1,+1,+1 |
| LOCUS DATA OF DISABLING BOUNDARY OF BOUNDARY 0 | | +3,0,+1,+1,−1,0,0,−1,0 |
| LOCUS DATA OF ENABLING BOUNDARY OF BOUNDARY 1 | | −1,+2,0,+1,0,+1,0,+1,0,+1,0 |
| LOCUS DATA OF DISABLING BOUNDARY OF BOUNDARY 1 | | 0,0,0,0,0,0,0,0,0,0,0 |
| LOCUS DATA OF ENABLING BOUNDARY OF BOUNDARY 2 | | 0,−1,−1,0,0,−1,0 |
| LOCUS DATA OF DISABLING BOUNDARY OF BOUNDARY 2 | | 0,+1,0,+1,−1,−1,−1 |
| LOCUS DATA OF ENABLING BOUNDARY OF BOUNDARY 3 | | −1,−1,−1,−1,−1,−1 |
| LOCUS DATA OF DISABLING BOUNDARY OF BOUNDARY 3 | | +1,0,+1,0,+1,0 |
| LOCUS DATA OF ENABLING BOUNDARY OF BOUNDARY 4 | | 0,0 |
| LOCUS DATA OF DISABLING BOUNDARY OF BOUNDARY 4 | | +2,0 |

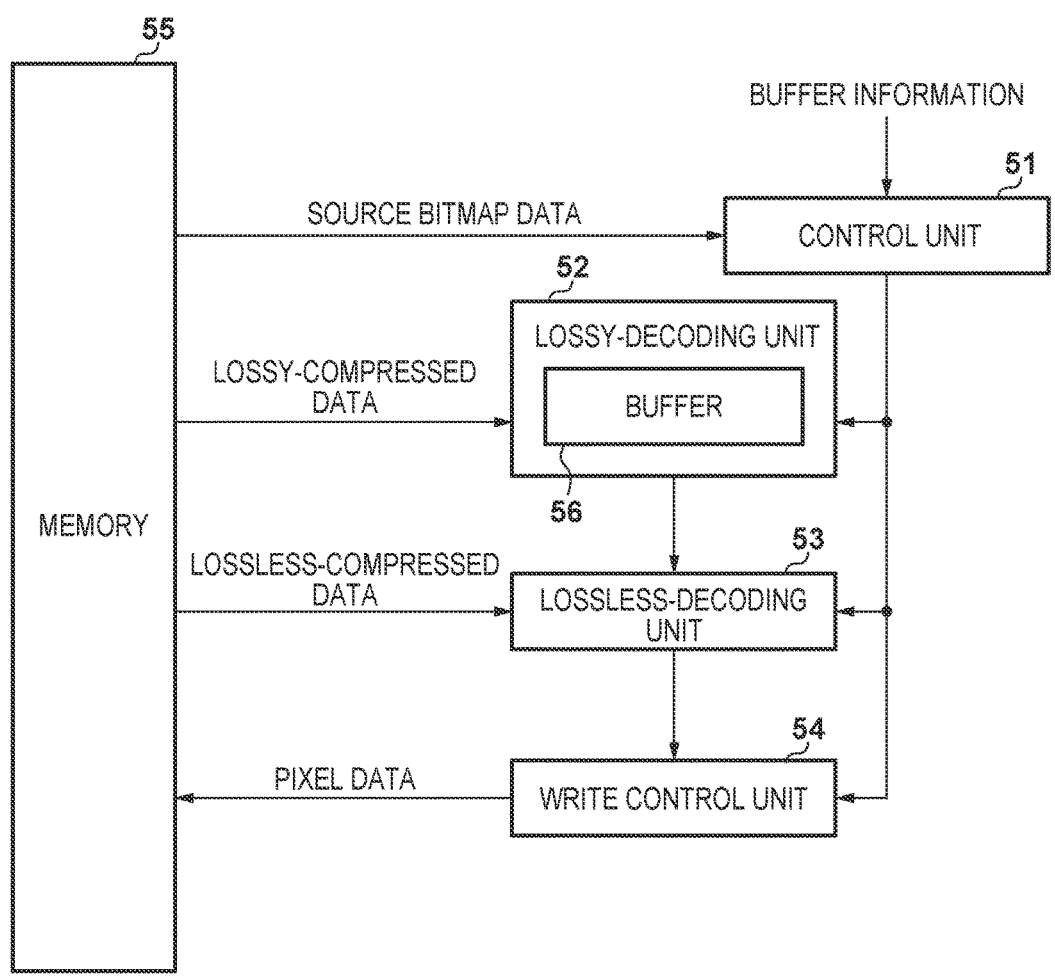

F I G. 14A

| STATE | 0 | 1 | 2 | 3 | 4 | 5 |
|---|---|---|---|---|---|---|
| LINE OF INTEREST | 0 | 0 | 0 | 0 | 1 | 1 |
| REMAINING BOUNDARY COUNT $R_N$ | 5 | 4 | 4 | 3 | 3 | 3 |
| NEW BOUNDARY BUFFER | BOUNDARY DATA 21 | null | BOUNDARY DATA 23 | null | BOUNDARY DATA 24 | BOUNDARY DATA 24 |
| REMAINING BOUNDARY COUNT $R_{Lc}$ OF LINE OF INTEREST | 0 | 0 | 0 | 0 | 2 | 1 |
| REMAINING BOUNDARY COUNT $R_{Ln}$ OF NEXT LINE | 0 | 1 | 1 | 2 | 0 | 1 |
| FIFO | null | [21] | null | [23] | [23] | [23][21] |
| CONTINUING BOUNDARY BUFFER | null | null | BOUNDARY DATA 21 | BOUNDARY DATA 23 | BOUNDARY DATA 21 | null |
| SUCCEEDING BOUNDARY | — | BOUNDARY DATA 21 | — | BOUNDARY DATA 23 | — | BOUNDARY DATA 21 |

F I G. 14B

| STATE | 6 | 7 | 8 | 9 | 10 | 11 |
|---|---|---|---|---|---|---|
| LINE OF INTEREST | 1 | 1 | 2 | 2 | 2 | 2 |
| REMAINING BOUNDARY COUNT $R_N$ | 3 | 3 | 3 | 3 | 3 | 2 |
| NEW BOUNDARY BUFFER | BOUNDARY DATA 24 | BOUNDARY DATA 24 | BOUNDARY DATA 24 | BOUNDARY DATA 24 | BOUNDARY DATA 24 | null |
| REMAINING BOUNDARY COUNT $R_{Lc}$ OF LINE OF INTEREST | 1 | 0 | 2 | 1 | 1 | 1 |
| REMAINING BOUNDARY COUNT $R_{Ln}$ OF NEXT LINE | 1 | 2 | 0 | 1 | 1 | 2 |
| FIFO | [21] | [21][23] | [23] | [23][21] | [21] | [21][24] |
| CONTINUING BOUNDARY BUFFER | BOUNDARY DATA 23 | null | BOUNDARY DATA 21 | null | BOUNDARY DATA 23 | BOUNDARY DATA 23 |
| SUCCEEDING BOUNDARY | – | BOUNDARY DATA 23 | – | BOUNDARY DATA 21 | – | BOUNDARY DATA 24 |

F I G. 14C

| STATE | 12 | 13 | 14 | ... |
|---|---|---|---|---|
| LINE OF INTEREST | 2 | 2 | 3 | ... |
| REMAINING BOUNDARY COUNT $R_N$ | 2 | 2 | 2 | ... |
| NEW BOUNDARY BUFFER | BOUNDARY DATA 26 | BOUNDARY DATA 26 | BOUNDARY DATA 26 | ... |
| REMAINING BOUNDARY COUNT $R_{Lc}$ OF LINE OF INTEREST | 1 | 0 | 3 | ... |
| REMAINING BOUNDARY COUNT $R_{Ln}$ OF NEXT LINE | 2 | 3 | 0 | ... |
| FIFO | [21][24] | [21][24][23] | [24][23] | ... |
| CONTINUING BOUNDARY BUFFER | BOUNDARY DATA 23 | null | BOUNDARY DATA 21 | ... |
| SUCCEEDING BOUNDARY | - | BOUNDARY DATA 23 | - | ... |

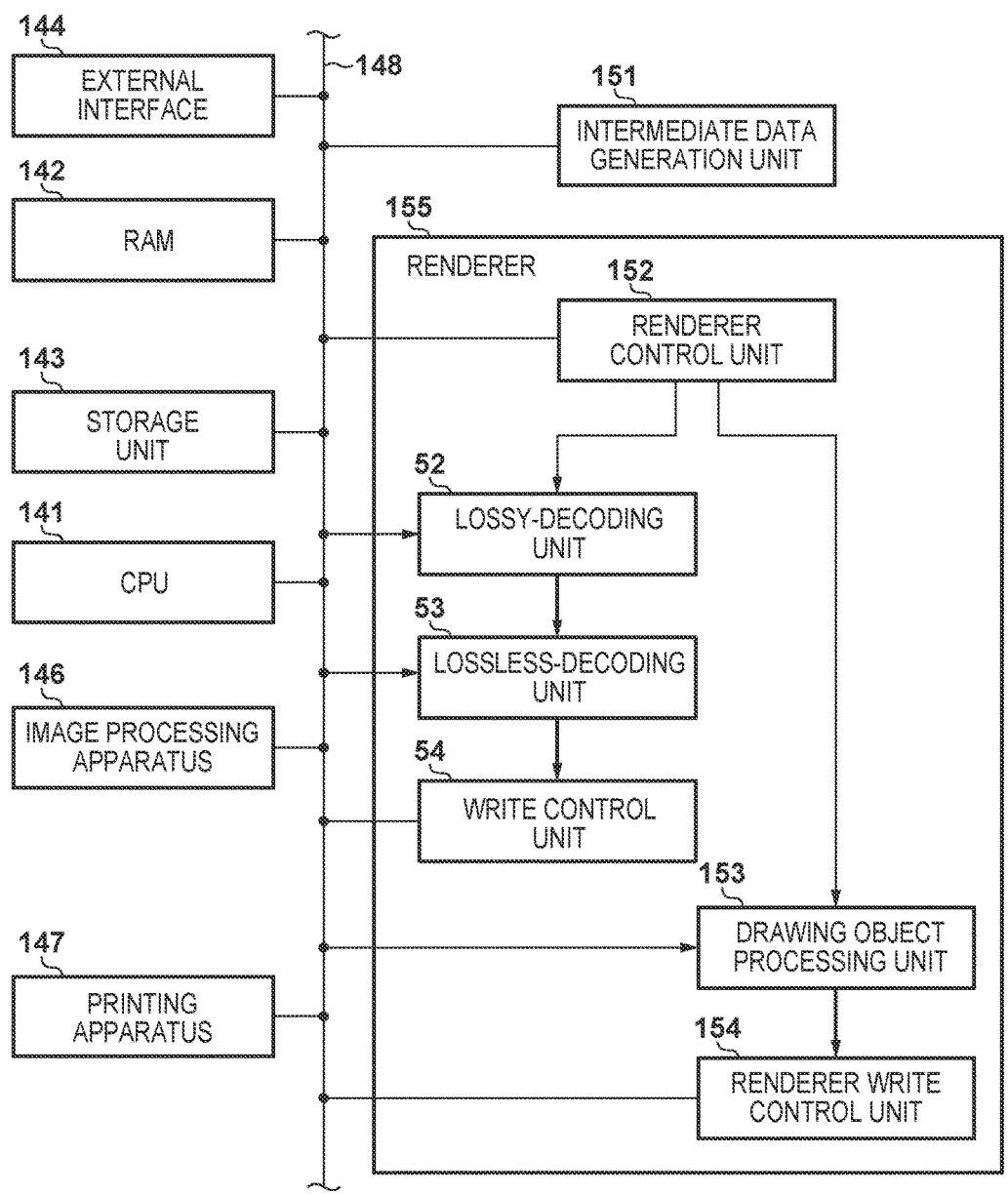

IMAGE DECODING APPARATUS AND METHOD THEREFOR

BACKGROUND OF THE INVENTION

Field of the Invention

The present invention relates to processing of decoding compressed image data.

Description of the Related Art

An image compression technique is applied to high-resolution image data having an enormous data amount to store the image data using smaller memory resources and transfer the image data via a network within a shorter time. On the other hand, the image compression technique is required not to degrade the image quality. As an image compression technique for decreasing a data amount while maintaining the image quality, U.S. Pat. No. 5,883,976 discloses a technique of dividing an image into one or more regions each including one or more pixels and switching a data compression method for each region.

As a technique of dividing an image into one or more regions and switching a data compression method, there is provided a technique of encoding image data to boundary data (to be referred to as region boundary data hereinafter) of regions and compressed data (to be referred to as region compression data hereinafter) of the regions. Each region boundary data includes information for specifying the position of a boundary, and attribute information for specifying the data compression method and region compression data of a region on the right side of the boundary.

The above technique adopts, as data compression methods, run-length encoding of a lossless-compression method and JPEG of a lossy-compression method. Therefore, the size of a region (to be referred to as a lossy-compression region hereinafter) to which the lossy-compression method is applied is restricted to an integer multiple of a minimum coding unit (MCU) which includes eight pixels in each of the horizontal and vertical directions. Thus, the lossy-compression region includes unnecessary pixels overlapping a region (to be referred to as lossless-compression region hereinafter) to which the lossless-compression method is applied.

An apparatus for decoding encoded data in which the lossy-compression region and the lossless-compression region coexist executes the following two steps. In the first step, the apparatus decodes the data (to be referred to as the lossy-compressed data hereinafter) of the lossy-compression region, and writes the resultant data in a memory. In the second step, the apparatus specifies the position of a boundary, decodes the data (to be referred to as the lossless-compressed data hereinafter) of the lossless-compression region, and writes the resultant data in the memory. At this time, the apparatus overwrites the pixel data written in the lossless-compression region in the first step.

As described above, when writing, in the memory, the decompression result of a compressed image including lossy-compressed data and lossless-compressed data, there are pixels where the decompression result of the lossy-compressed data is overwritten by that of the lossless-compressed data. As a result, a system bus band and a memory band are wastefully consumed.

SUMMARY OF THE INVENTION

The present invention has been made in consideration of the above problem, and provides a technique of decoding image data without overwriting the decompression result of the first image data by the decompression result of the second image data when the first image data compressed by the first method and the second image data compressed by the second method coexist.

According to an aspect of the invention, there is provided an image decoding apparatus for decoding data in which first data obtained by compressing an image for each region by a first method and second data obtained by compressing some regions of the image by a second method different from the first method coexist, and outputting the image, the apparatus comprising: a first decoding unit configured to decode the first data and output pixel data of each pixel forming the image; a second decoding unit configured to decode the second data of a compression region based on boundary information indicating the compression region compressed by the second method; and a write unit configured to write, in a memory, pixel data of each pixel forming the image obtained from the second decoding unit, wherein the first decoding unit outputs the pixel data of each pixel to the second decoding unit, and the second decoding unit determines, based on the boundary information, whether a processing target pixel is included in the compression region, and outputs, for a pixel outside the compression region, the pixel data acquired from the first decoding unit to the write unit, and outputs, for a pixel included in the compression region, the pixel data obtained by decoding by the second decoding unit to the write unit.

According to the present invention, when the first image data compressed by the first method and the second image data compressed by the second method coexist, it is possible to decode image data without overwriting the decompression result of the first image data by the decompression result of the second image data.

Further features of the present invention will become apparent from the following description of exemplary embodiments with reference to the attached drawings.

BRIEF DESCRIPTION OF THE DRAWINGS

FIG. 4 is a table for explaining the lossless-compressed data of the rectangular region;

FIG. 5 is a block diagram showing an example of the arrangement of an image decoding apparatus according to an embodiment;

FIGS. 14A-14C are tables for explaining the respective parameters of the lossless-decoding unit;

FIG. 16 is a block diagram showing an example of the arrangement of an image processing apparatus including a rendering system to which an image decoding apparatus is applied.

DESCRIPTION OF THE EMBODIMENTS

An image decoding apparatus and image decoding method according to embodiments of the present invention will be described in detail below with reference to the accompanying drawings. Note that the embodiments are not intended to limit the present invention related to the scope of the claims, and not all of the combinations of arrangements set forth in the embodiments are necessarily required with respect to the means to solve the problems according to the present invention. Note also that a raster scan in which the scanning direction of pixels is a direction from left to right and from the upper side to the lower side will be described below but the scanning direction is not limited to this.

Structure of Encoded Data

Figure 1:
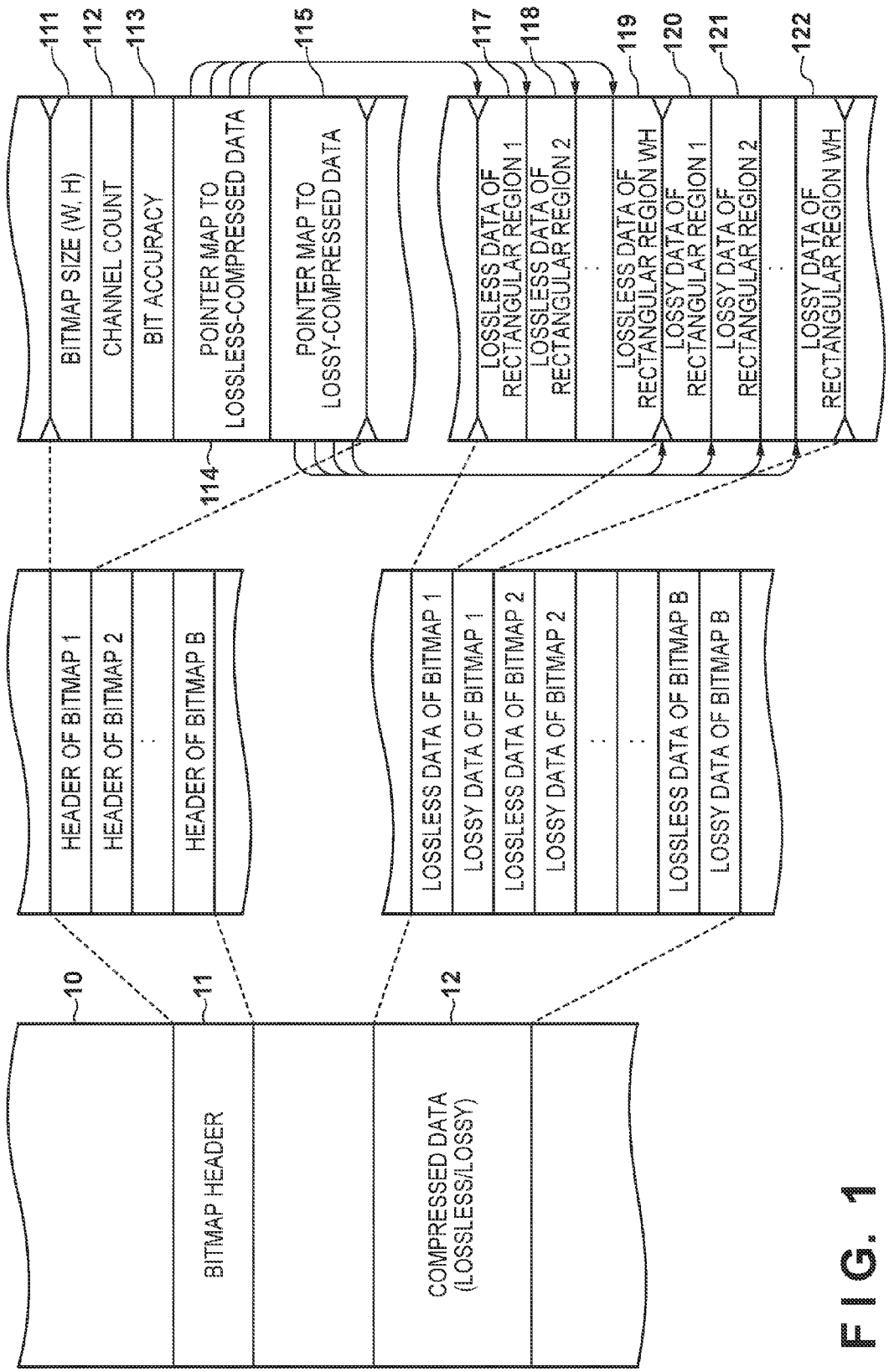
FIG. 1 is a view showing the memory image of source bitmap data.

Before a description of an image decoding apparatus, the structure of encoded data will be explained. FIG. 1 shows a memory image 10 of source bitmap data. The memory image 10 is bitmap data included in a drawing region such as a page or frame, and includes a bitmap header 11 and compressed data 12.

The bitmap header 11 is formed by a set of headers defined for respective bitmaps (bitmaps 1, 2, . . . , B) included in the drawing region such as a page or frame. For example, the header of bitmap 1 includes a bitmap size 111, a channel count 112, bit accuracy 113, a pointer map 114 as a set of pointers of lossless-compressed data, and a pointer map 115 as a set of pointers of lossy-compressed data. Note that the lossless-compressed data may be referred to as "lossless data" hereinafter, and lossy-compressed data may be referred to as "lossy data" hereinafter.

The compressed data 12 is formed by a set of compressed data for the respective bitmaps (bitmaps 1, 2, . . . , B) included in the drawing region such as a page or frame. The compressed data of bitmap 1 includes lossless data 117, 118, . . . , 119 of rectangular regions 1, 2, . . . , WH, and lossy data 120, 121, . . . , 122 of rectangular regions 1, 2, . . . , WH.

Each bitmap is divided into rectangular regions each including m×m pixels (for example, 64×64 pixels). For example, bitmap 1 includes W×H rectangular regions. If the size of the bitmap is not an integer multiple of m×m pixels, padding is added outside the bitmap to have a size which is an integer multiple of m×m pixels, and then the bitmap is divided into rectangular regions, and data compression is performed for each rectangular region.

The bitmap size 111 indicates how many times larger the width and height of the corresponding bitmap are than the rectangular region of m×m pixels. The channel count 112 indicates the number of color components. RGB data has three channels, CMYK data has four channels, YUV data has three channels, and black-and-white (BW) data has one channel. The bit accuracy 113 indicates a bit depth per channel.

The pointer map 114 includes a set of pointers of lossless data, and each pointer indicates the start address of the lossless data of a corresponding rectangular region. The pointer map 115 includes a set of pointers of lossy data, and each pointer indicates the start address of the lossy data of a corresponding rectangular region.

The lossless data 117, 118, . . . , 119 are data obtained by performing lossless-compression for at least some of the image data of the respective rectangular regions of bitmap 1. Each lossless data includes the boundary information within the corresponding rectangular region and the color information of a single-color region.

The lossy data 120, 121, . . . , 122 are data obtained by performing lossy-compression for the image data of the respective rectangular regions of bitmap 1. Each lossy data includes a set of compressed data for respective minimum coding units (MCUs) of the corresponding rectangular region. Assume that, for example, JPEG is used for lossy-compression according to the embodiments. Assume also that the MCU of JPEG is 8×8 pixels, and the rectangular region includes 64×64 pixels. In this case, each lossy data includes a set of JPEG data each corresponding to the MCU of 8×8=64.

Figure 2:
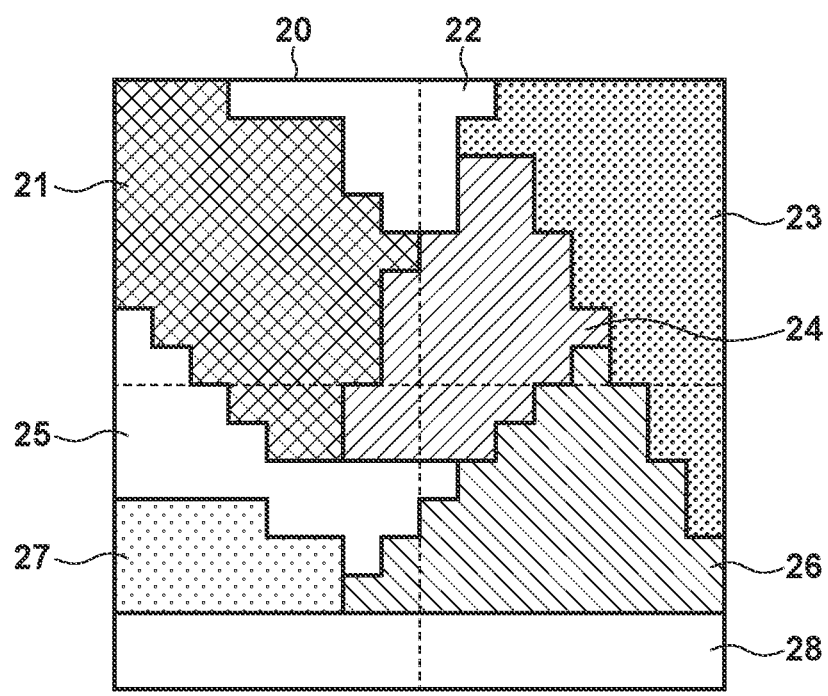
FIG. 2 is a view showing an example of a rectangular region of 16×16 pixels.

FIG. 2 shows an example of a rectangular region 20 of 16×16 pixels when m=16. Referring to FIG. 2, thick solid lines represent the edges of the rectangular region 20 (the boundaries of the pixel set), and horizontal and vertical broken lines represent the boundaries of 8×8 pixels corresponding to the MCU of JPEG. The rectangular region 20 includes, for example, the following regions.

First region 21: lossless-compression region
Second region 22: lossy-compression region
Third region 23: lossless-compression region
Fourth region 24: lossless-compression region
Fifth region 25: lossy-compression region
Sixth region 26: lossless-compression region
Seventh region 27: lossless-compression region
Eighth region 28: lossy-compression region In the rectangular region 20, adjacent pixels of the same color are classified into a lossless-compression region. Note that JPEG used in the embodiments is a method of performing encoding for each predetermined rectangular region. As for the rectangular region 20 shown in FIG. 2, two compression methods are used to perform compression, as follows. Of the data of the rectangular region 20, the data of the pixels of the lossless-compression regions is encoded (lossless-encoded) by a lossless-compression method. Furthermore, after all the pixels of the lossless-compression regions are replaced by a predetermined pixel value set in consideration of compression efficiency, the data of the rectangular region 20 is encoded (lossy-encoded) by a lossy-compression method.

Figure 3A:
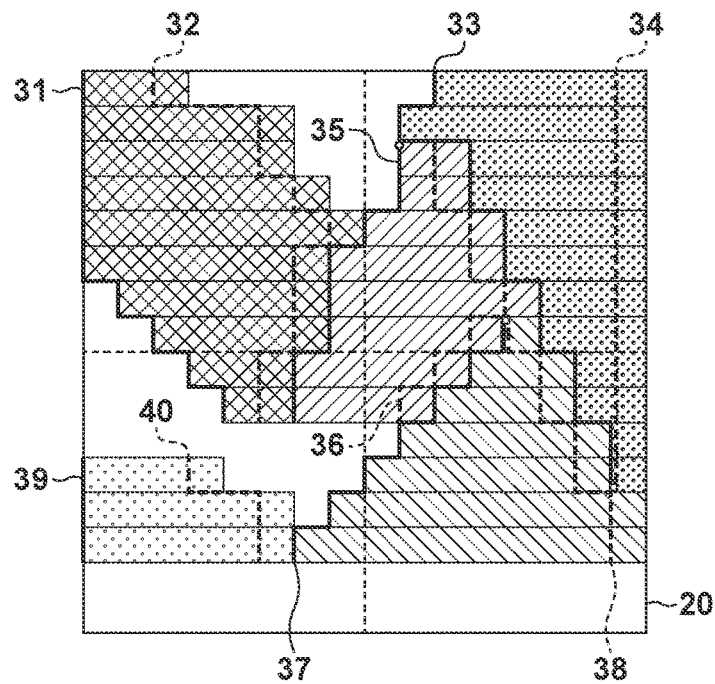
FIGS. 3A and 3B are views respectively showing the boundary information of the rectangular region and an example of the format of lossless-compressed data.

The boundary information of the rectangular region 20 and an example of the format of lossless-compressed data 41 will be described with reference to FIGS. 3A and 3B. FIG. 3A shows the boundary information, in which each thick solid line corresponds to an attribute "enabling boundary" indicating the pixel of the left edge of a lossless-compression region on a horizontal-direction line (to be referred to as a line hereinafter), and each thick broken line corresponds to an attribute "disabling boundary" indicating the pixel of the right edge of the lossless-compression region on the line.

That is, a given lossless-compression region starts from the pixel of the enabling boundary and ends at the pixel of the disabling boundary on each line.

An encoding apparatus generates the enabling and disabling boundaries not to intersect each other. The enabling and disabling boundaries are generated as a pair of pieces of boundary information. In the lossless-compression region, the correspondences between the regions shown in FIG. 2 and the respective pairs of the enabling and disabling boundaries shown in FIG. 3A are as follows.

Enabling boundary 31 and disabling boundary 32: first region 21
Enabling boundary 33 and disabling boundary 34: third region 23
Enabling boundary 35 and disabling boundary 36: fourth region 24
Enabling boundary 37 and disabling boundary 38: sixth region 26
Enabling boundary 39 and disabling boundary 40: seventh region 27

Figure 3B:
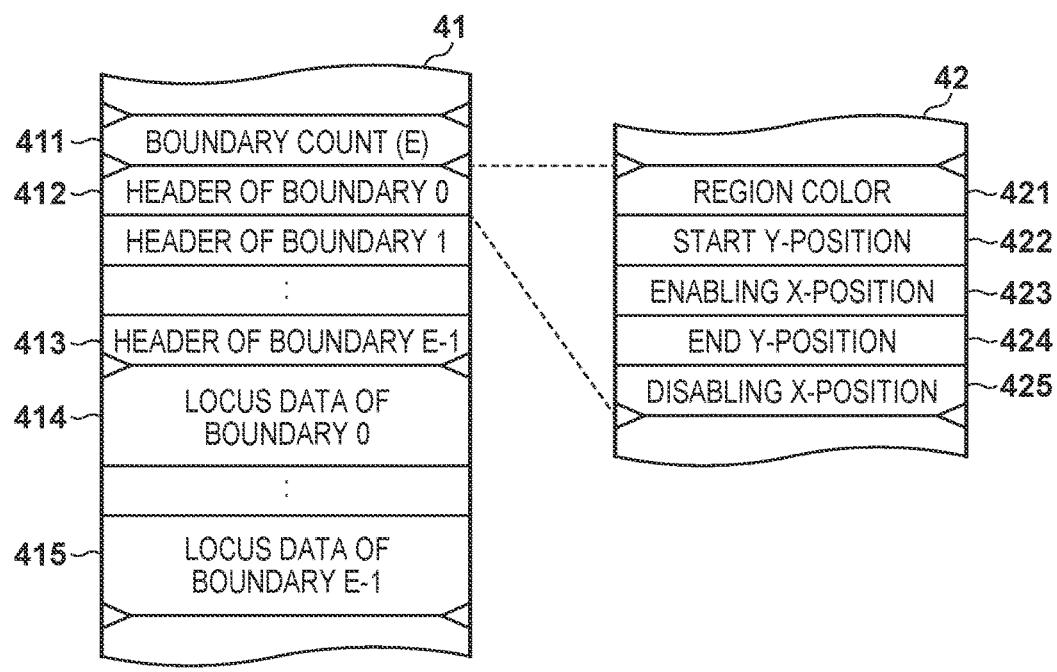

FIG. 3B shows an example of the format of lossless-compressed data 41. The lossless-compressed data 41 corresponds to the lossless-compressed data of the rectangular region 20. A boundary count 411 indicates a number E of pairs of enabling and disabling boundaries in the rectangular region 20. A header 412 of boundary 0 is the header information of the enabling and disabling boundaries of the first lossless-compression region. A header 413 of boundary E−1 is the header information of the enabling and disabling boundaries of the (E−1)th lossless-compression region.

Locus data 414 of boundary 0 is data for specifying the horizontal-direction position X (to be referred to as a position X hereinafter) of boundary 0, for which a function, positions X on the respective lines, the differences in the position X between the respective lines, or the like can be used. Locus data 415 of boundary E−1 is data for specifying a position X of boundary E−1. An edge header 42 indicates the format of each of the pieces 412 and 413 of header information, and stores the following values.

Region color 421: color of lossless-compression region
Start Y-position 422: vertical-direction position Y (to be referred to as position Y hereinafter) of enabling point of enabling boundary
Enabling X-position 423: horizontal-direction position X of enabling point of enabling boundary
End Y-position 424: vertical-direction position Y of disabling point of enabling boundary
Disabling X-position 425: horizontal-direction position X of enabling point of disabling boundary Note that the positions Y of the enabling and disabling points of the disabling boundary are equal to those of the enabling and disabling points of the paired enabling boundary. The boundary headers 412 and 413 are sorted in ascending order of the start Y-positions 422. The headers having the equal start Y-positions 422 are sorted in ascending order of the enabling X-positions 423. In other words, the boundary headers are arranged in the scan order of the rectangular region 20 from the upper left side to the lower right side, and stored in the memory.

On each line, pixels from the position X of the enabling boundary indicating the enabling information of the lossless-compression region to the position X of the disabling boundary indicating the disabling information of the lossless-compression region are of a color defined in the region color 421. If there is no gap between the disabling boundary and the next enabling boundary on one line, this indicates that lossless-compression regions are adjacent to each other. Alternatively, if there is a gap between the disabling boundary and the next enabling boundary on one line, there is a lossy-compression region between the lossless-compression regions, and pixels from a pixel on the right side of the disabling boundary to a pixel on the left side of the next enabling boundary are obtained by decompressing the lossy-compressed data.

If there is no enabling position at the left end (X=0) of the line, pixels from a pixel at the left end (X=0) of the line to a pixel on the left side of the position X of the enabling boundary appearing first are obtained by decompressing the lossy-compressed data. If there is no enabling position on the line, the entire line is included in a lossy-compression region, and pixels from the left end (X=0) to the right end (for example, X=15) of the line are obtained by decompressing the lossy-compressed data.

If the data compression method of the image data of the lossy-compression regions of the rectangular region 20 is JPEG, the lossy-compressed data is formed from two MCUs each of which includes 8×8 pixels and which are arranged in each of the vertical and horizontal directions, that is, four MCUs in total, and includes all the pixels of the rectangular region 20, as described above. Therefore, if the lossy-compressed data is decompressed, pixels overlapping the lossless-compression regions 21, 23, 24, 26, and 27 shown in FIG. 2 are decoded. Note that the pixel values of the lossless-compression regions 21, 23, 24, 26, and 27 obtained by decoding the lossy-compressed data are the replaced predetermined pixel values.

The lossless-compressed data of the rectangular region 20 will be described with reference to FIG. 4. The following description assumes that the number of channels of color components is three, and the color space is an RGB space. Since the rectangular region 20 includes five pairs of enabling and disabling boundaries respectively corresponding to the lossless-compression regions 21, 23, 24, 26, and 27, the boundary count E is 5. Boundary 0 corresponds to the first region 21. As shown in FIG. 4, a region color "0xFF0000" is set in the header of boundary 0. That is, this indicates that the first region 21 is formed by pixels of a color of R=255, G=0, and B=0. In addition, the start Y-position "0" of the enabling boundary 31 and disabling boundary 32, the enabling X-position "0" of the enabling boundary 31, the end Y-position "9" of the enabling boundary 31 and disabling boundary 32, and the disabling X-position "2" of the disabling boundary 32 are set.

Similarly, boundaries 1, 2, 3, 4 respectively correspond to the third region 23, the fourth region 24, the sixth region 26, and the seventh region 27, and data shown in FIG. 4 are set in the headers of boundaries 1 to 4.

The locus of the enabling boundary of boundary 0 exists between a line of Y=0 and a line of Y=9. The X-position is set to 0, 0, 0, 0, 0, 0, 1, 2, 3, and 4 in ascending order of the Y-positions of the lines. As the locus data of the enabling boundary of boundary 0, the differences "0, 0, 0, 0, 0, +1, +1, +1, +1" in the X-position between the lines in the scan order are set. The locus of the disabling boundary of boundary 0 exists between the line of Y=0 and the line of Y=9. The X-position is set to 2, 5, 5, 6, 7, 6, 6, 6, 5, and 5 in ascending order of the Y-positions of the lines. As the locus data of the disabling boundary of boundary 0, the differences "+3, 0, +1, +1, −1, 0, 0, −1, 0" in the X-position between the lines in the scan order are set. As described above, the nonlinear boundaries of the first region 21 can be defined.

Boundary 1 corresponds to the third region 23. Therefore, the loci of the enabling and disabling boundaries of boundary 1 exist between the line of Y=0 and a line of Y=11.

Boundary 2 corresponds to the fourth region 24. Therefore, the loci of the enabling and disabling boundaries of boundary 2 exist between a line of Y=2 and the line of Y=9.

Boundary 3 corresponds to the sixth region 26. Therefore, the loci of the enabling and disabling boundaries of boundary 3 exist between a line of Y=7 and a line of Y=13.

Boundary 4 corresponds to the seventh region 27. Therefore, the loci of the enabling and disabling boundaries of boundary 4 exist between the line of Y=11 and the line of Y=13.

As described above, the locus data shown in FIG. 4 are set.

Decoding processing of decoding image data in which image data compressed by the lossy-compression method and image data compressed by the lossless-compression method coexist without overwriting the pixel data with reference to boundary information will be described below.

First Embodiment

Arrangement of Image Decoding Apparatus

FIG. 5 is a block diagram showing an example of the arrangement of an image decoding apparatus according to the embodiment. A control unit 51 inputs source bitmap data stored in a memory 55 and buffer information indicating the address and size of a buffer area in which pixels of a decoding result are written. The control unit 51 interprets a bitmap header 11 to control a lossy-decoding unit 52, a lossless-decoding unit 53, and a write control unit 54. Note that the source of the source bitmap data to be decoded, which is stored in the memory 55, is not important, and is thus not shown.

Under the control of the control unit 51, the lossy-decoding unit 52 inputs lossy-compressed data stored in the memory 55, decodes the lossy-compressed data, and outputs pixel data of a decoding result to the lossless-decoding unit 53. The lossy-decoding unit 52 includes, for example, a JPEG decoder and a buffer 56 for 16×8 pixels, performs processing of sorting the decoding results of one MCU in the vertical direction and two MCUs in the horizontal direction, and sequentially outputs, to the lossless-decoding unit 53, pixel data within the rectangular region for each line of 16 pixels. The lossy-decoding unit 52 is in valid state when pixel data is stored in the buffer 56. In this embodiment, the lossy-decoding unit 52 is implemented by a dedicated circuit. Each pixel data output from the lossy-decoding unit 52 is output to the lossless-decoding unit 53 without being stored in the memory 55.

Under the control of the control unit 51, the lossless-decoding unit 53 generates pixel data of the rectangular region by decoding the lossless-compressed data stored in the memory 55. The lossless-decoding unit 53 inputs the pixel data output from the lossy-decoding unit 52, selects one of the pixel data output from the lossy-decoding unit 52 for each pixel and the pixel data obtained by decoding the lossless-compressed data, and outputs the selected pixel data to the write control unit 54. This embodiment assumes that the lossless-decoding unit 53 is implemented by software processing in which a processor provided separately from a CPU and including a dedicated work memory reads out a program from a dedicated program memory or a common system memory, and executes it. The processor for implementing the lossless-decoding unit 53 includes one or more interfaces for transmitting/receiving data to/from another component. Especially, an interface for connecting the lossless-decoding unit 53 and the lossy-decoding unit 52 has a valid signal for sending an enabling notification from the lossy-decoding unit 52, and a ready signal indicating a ready state in which the lossless-decoding unit 53 is to input the pixel data from the buffer 56 of the lossy-decoding unit 52. The interface also has a data signal for performing data transfer from the lossy-decoding unit 52.

Under the control of the control unit 51, the write control unit 54 calculates an address at which the pixel data output from the lossless-decoding unit 53 is to be written, and writes the pixel data in the buffer area of the memory 55. Note that in this embodiment, the write control unit 54 is also implemented by software processing in which the processor for implementing the lossless-decoding unit 53 reads out and executes a program.

Lossless-Decoding Unit

Figure 6:
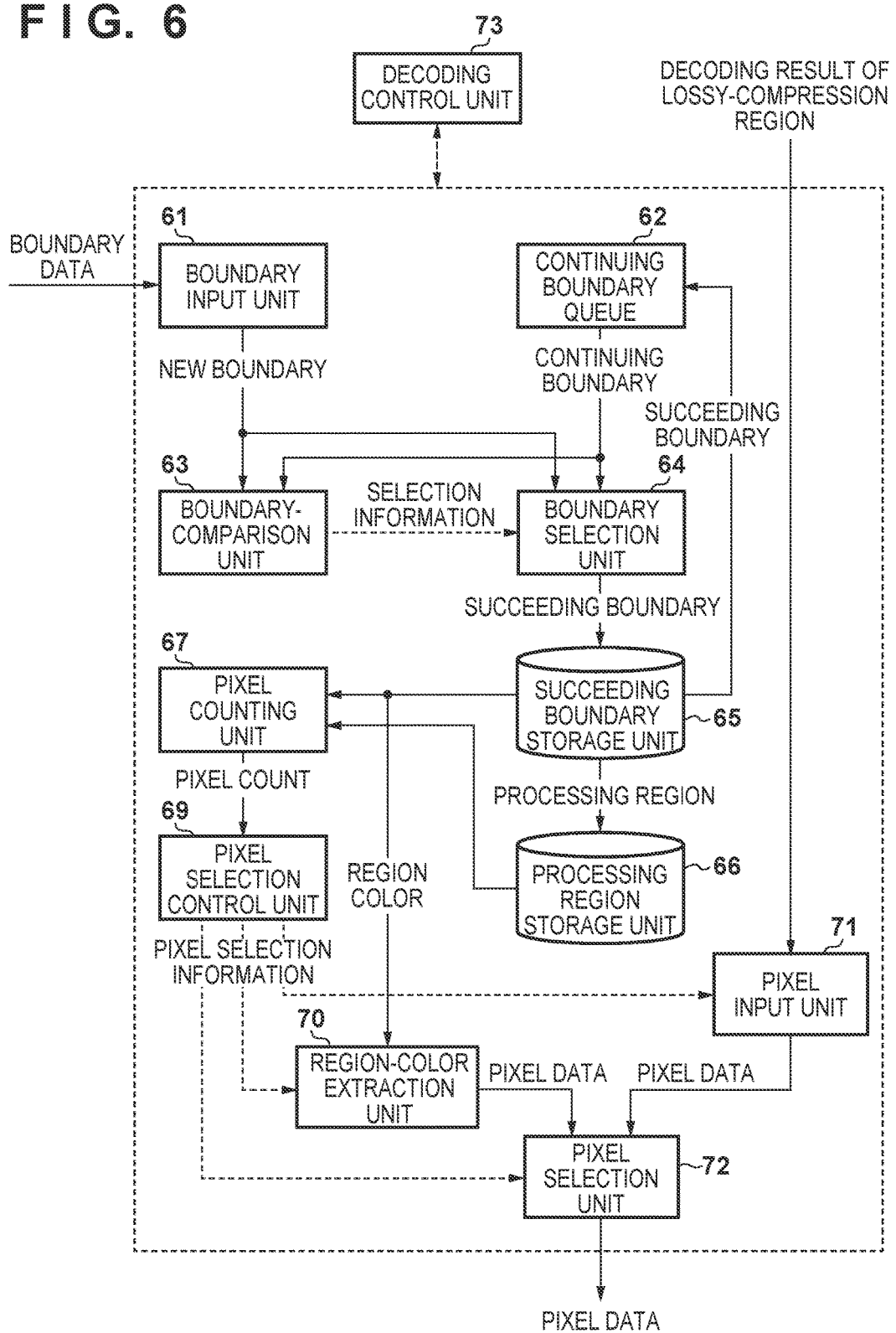
FIG. 6 is a block diagram showing an example of the arrangement of a lossless-decoding unit.

FIG. 6 is a block diagram showing an example of the arrangement of the lossless-decoding unit 53. A decoding control unit 73 controls the respective components of the lossless-decoding unit 53 (to be described later) to perform image decoding processing. Note that the image decoding processing will be described in detail later.

A boundary input unit 61 includes a new boundary buffer for temporarily storing boundary data read out from the memory 55 as a "new boundary" (or new boundary information) (to be described later), and a remaining boundary count $R_N$ serving as a counter indicating the number of unprocessed new boundaries. The boundary input unit 61 inputs a boundary count E (see FIG. 4) from the lossless-compressed data stored in the memory 55, and sets the input boundary count E in the remaining boundary count $R_N$ serving as a counter. Furthermore, the boundary input unit 61 inputs a boundary header and a set (to be referred to as boundary data hereinafter) of corresponding locus data, and stores the input boundary data in the new boundary buffer. When the boundary data is output from the new boundary buffer, the remaining boundary count $R_N$ is decremented and the boundary data is deleted from the new boundary buffer. A pair of enabling and disabling boundaries indicated by the boundary data stored in the new boundary buffer will be referred to as a "new boundary" (or new boundary information hereinafter).

A continuing boundary queue 62 includes a FIFO to which boundary data selected as a "succeeding boundary" (or succeeding boundary information) (to be described later) is input, and a continuing boundary buffer for temporarily storing boundary data extracted from the FIFO. A pair of enabling and disabling boundaries indicated by the boundary data stored in the continuing boundary buffer will be referred to as a "continuing boundary" (or continuing boundary information) hereinafter.

The continuing boundary queue 62 also includes, as variables for managing the number of boundary data in the FIFO, a remaining boundary count $R_{Lc}$ serving as a counter indicating the number of boundaries on a line of interest and a remaining boundary count $C_{Ln}$ serving as a counter indicating the number of boundaries on the next line. The remaining boundary count $R_{Lc}$ is decremented when the boundary data is read out from the continuing boundary buffer, and details thereof will be described later. The remaining boundary count $C_{Ln}$ is incremented when inputting boundary data to the FIFO. When the line of interest is incremented, the remaining boundary count $C_{Ln}$ is copied to the remaining boundary count $R_{Lc}$, and is then cleared.

A boundary-comparison unit 63 compares the new boundary with the continuing boundary, and generates selection information for selecting boundary data whose Y-position is small or boundary data whose X-position is small if the Y-positions are equal to each other. If a new boundary exists and no continuing boundary exists, the boundary-comparison unit 63 generates selection information for selecting the new boundary. On the other hand, if no new boundary exists and a continuing boundary exists, the boundary-comparison unit 63 generates selection information for selecting the continuing boundary.

A boundary selection unit 64 selects the new boundary or the continuing boundary as a succeeding boundary in accordance with the selection information input from the boundary-comparison unit 63, and stores the selected succeeding boundary in a succeeding boundary storage unit 65. A processing region storage unit 66 stores a processing region acquired from the succeeding boundary. The processing region is a lossless-compression region on the line of interest, and is a region where pixel data is decoded.

A pixel counting unit 67 calculates a pixel count N1 of the lossless-compression region and a pixel count N2 of the lossy-compression region on the line of interest based on the succeeding boundary stored in the succeeding boundary storage unit 65 and the processing region stored in the processing region storage unit 66.

A pixel selection control unit 69 generates pixel selection information for processing the pixels in accordance with the pixel counts N1 and N2 calculated by the pixel counting unit 67. A region-color extraction unit 70 outputs, as pixel data, to a pixel selection unit 72, a boundary color indicated by the succeeding boundary stored in the succeeding boundary storage unit 65.

Based on the pixel selection information, a pixel input unit 71 inputs the pixel data output from the lossy-decoding unit 52, and outputs the input pixel data to the pixel selection unit 72. To input the pixels from the buffer 56 of the lossy-decoding unit 52 based on the pixel selection information, the pixel input unit 71 asserts the ready signal via the above-described interface to notify the lossy-decoding unit 52 of the ready state. If both the valid signal and the ready signal have been asserted, that is, the lossy-decoding unit 52 is in a valid state and the lossless-decoding unit 53 is in a ready state, the pixel input unit 71 inputs the pixel data from the buffer 56. Note that if the valid signal or the ready signal has not been asserted via the interface, the pixel input unit 71 stands by until both the valid signal and the ready signal are asserted.

Based on the pixel selection information, the pixel selection unit 72 selectively outputs, to the write control unit 54, the pixel data output from the region-color extraction unit 70 or the pixel data output from the pixel input unit 71. Therefore, the pixel selection unit 72 outputs, for each pixel, one of the pixel data output from the region-color extraction unit 70 and the pixel data output from the pixel input unit 71. The pixel data output from the pixel input unit 71 for the pixel which has been selected to output the pixel data output from the region-color extraction unit 70 is discarded.

Overview of Operation of Lossless-Decoding Unit

Although details will be described later, an overview of the processing procedure of the lossless-decoding unit 53 will be explained by exemplifying a rectangular region 20 shown in FIG. 2. The respective parameters of the lossless-decoding unit 53 will be described with reference to FIGS. 14A-14C. The boundary input unit 61 sets the boundary count E=5 in the remaining boundary count $R_N$, inputs the boundary data (to be referred to as boundary data 21 hereinafter) of a first lossless-compression region 21, and stores the boundary data in the new boundary buffer. At this time, the continuing boundary queue 62 and the continuing boundary buffer are empty (state 0 in FIG. 14A).

Since the continuing boundary buffer is empty, the boundary-comparison unit 63 selects the new boundary as a succeeding boundary. As a result, the boundary data 21 is input to the FIFO of the continuing boundary queue 62, and the remaining boundary count $R_N$ is decremented (state 1). The decoding control unit 73 outputs 0xFF0000 as pixel data for 3 pixels from the left end of the start line (line 0) of the rectangular region 20 with reference to the boundary data 21.

The boundary input unit 61 inputs the boundary data (to be referred to as boundary data 23 hereinafter) of a second lossless-compression region 23, and stores the boundary data in the new boundary buffer. On the other hand, the continuing boundary queue 62 stores the boundary data 21 extracted from the FIFO in the continuing boundary buffer (state 2).

The boundary-comparison unit 63 compares the new boundary (boundary data 23) with the continuing boundary (boundary data 21), and selects the new boundary as a succeeding boundary. As a result, the boundary data 23 is input to the FIFO, and the remaining boundary count $R_N$ is decremented (state 3). With reference to the boundary data 23, the decoding control unit 73 outputs, as pixel data for 7 pixels from the fourth pixel of the start line (line 0), pixel data input by the pixel input unit 71. Furthermore, the decoding control unit 73 outputs 0x00FF00 as pixel data from the 11th pixel to the right end pixel, and increments the line of interest.

The boundary input unit 61 inputs the boundary data (to be referred to as boundary data 24 hereinafter) of a third lossless-compression region 24, and stores the boundary data in the new boundary buffer. On the other hand, the boundary data 21 remains stored in the continuing boundary buffer (state 4).

The boundary-comparison unit 63 compares the new boundary (boundary data 24) with the continuing boundary (boundary data 21), and selects the continuing boundary as a succeeding boundary. As a result, the boundary data 21 is input to the FIFO (state 5). The decoding control unit 73 outputs 0xFF0000 as pixel data for 6 pixels from the left end of the line (line 1) of interest with reference to the boundary data 21.

The continuing boundary queue 62 stores the boundary data 23 in the continuing boundary buffer. On the other hand, the boundary data 24 remains stored in the new boundary buffer (state 6 in FIG. 14B).

The boundary-comparison unit 63 compares the new boundary (boundary data 24) with the continuing boundary (boundary data 23), and selects the continuing boundary as a succeeding boundary. As a result, the boundary data 23 is input to the FIFO (state 7). With reference to the boundary data 23, the decoding control unit 73 outputs, as pixel data for 3 pixels from the seventh pixel of the line (line 1) of interest, the pixel data input by the pixel input unit 71. Furthermore, the decoding control unit 73 outputs 0x00FF00 as pixel data from the 10th pixel to the right end pixel, and increments the line of interest.

The continuing boundary queue 62 stores the boundary data 21 in the continuing boundary buffer. On the other hand, the boundary data 24 remains stored in the new boundary buffer (state 8).

The boundary-comparison unit 63 compares the new boundary (boundary data 24) with the continuing boundary (boundary data 21), and selects the continuing boundary as a succeeding boundary. As a result, the boundary data 21 is input to the FIFO (state 9). The decoding control unit 73 outputs 0xFF0000 as pixel data for 6 pixels from the left end of the line (line 2) of interest with reference to the boundary data 21.

The continuing boundary queue 62 stores the boundary data 23 in the continuing boundary buffer. On the other hand, the boundary data 24 remains stored in the new boundary buffer (state 10).

The boundary-comparison unit 63 compares the new boundary (boundary data 24) with the continuing boundary (boundary data 23), and selects the new boundary as a succeeding boundary. As a result, the boundary data 24 is input to the FIFO (state 11). With reference to the boundary data 24, the decoding control unit 73 outputs, as pixel data for 2 pixels from the eighth pixel of the line (line 2) of interest, the pixel data input by the pixel input unit 71. Furthermore, the decoding control unit 73 outputs 0x0000FF as pixel data for 2 pixels from the ninth pixel.

The boundary input unit 61 decrements the remaining boundary count $R_N$, inputs the boundary data (to be referred to as boundary data 26 hereinafter) of the fourth lossless-compression region 26, and stores the boundary data in the new boundary buffer. On the other hand, the boundary data 23 remains stored in the continuing boundary buffer (state 12 in FIG. 14C).

The boundary-comparison unit 63 compares the new boundary (boundary data 26) with the continuing boundary (boundary data 23), and selects the continuing boundary as a succeeding boundary. As a result, the boundary data 23 is input to the FIFO of the continuing boundary queue 62 (state 13). The decoding control unit 73 outputs 0x00FF00 as pixel data from the 12th pixel to the right end pixel of the line (line 2) of interest with reference to the boundary data 23, and increments the line of interest.

The continuing boundary queue 62 stores the boundary data 21 in the continuing boundary buffer. On the other hand, the boundary data 26 remains stored in the new boundary buffer (state 14). Although a description of the subsequent processing will be omitted, the above processing procedure is repeated up to the last line of the rectangular region 20 to complete decoding of the rectangular region 20. A description of changes in remaining boundary counts $R_{Lc}$ and $R_{Ln}$ has been omitted above but details will be described later.

Decoding Processing

Figure 7:
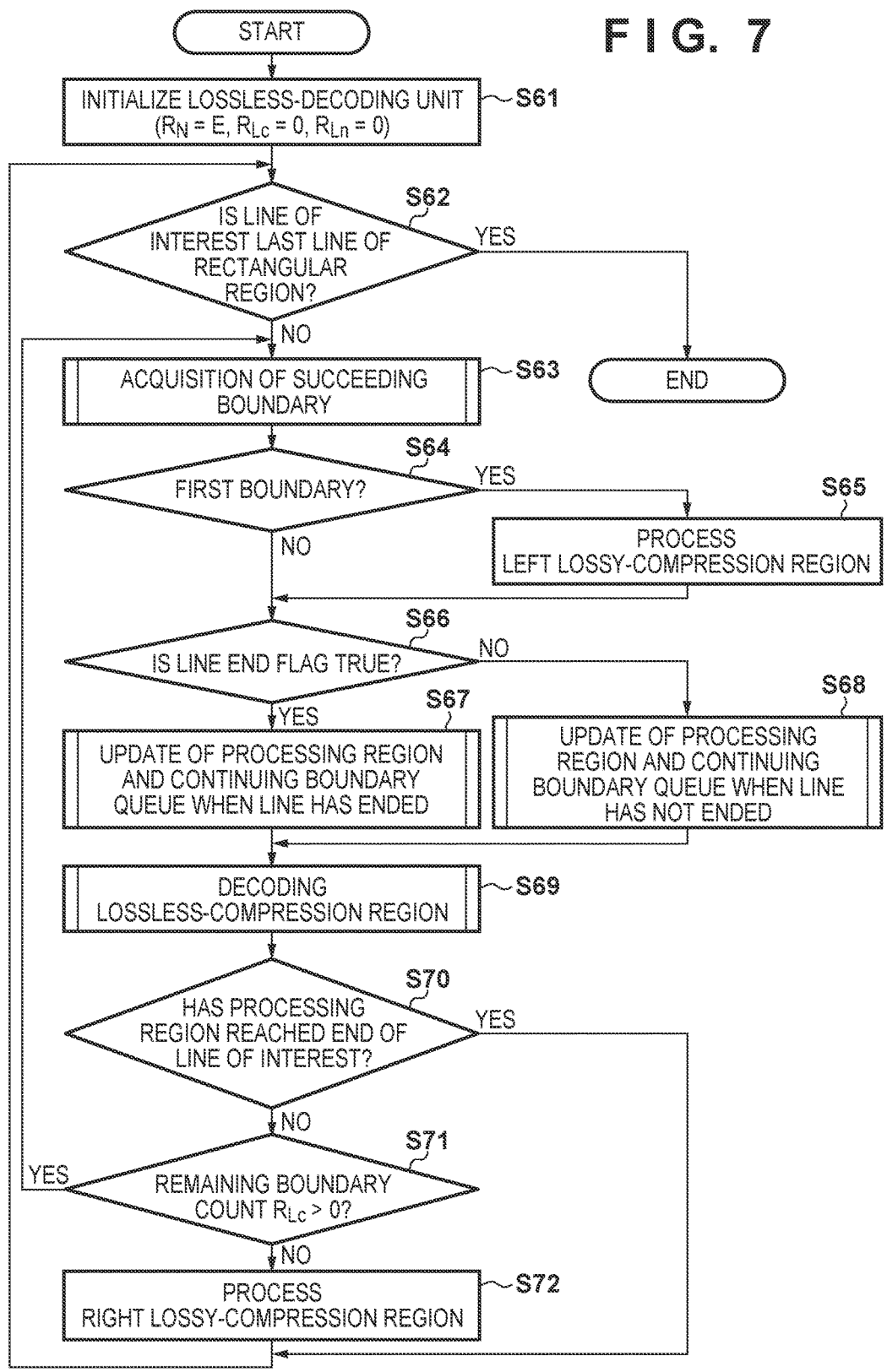
FIG. 7 is a flowchart for explaining pixel data output processing including decoding processing by the lossless-decoding unit.

Pixel data output processing including decoding processing by the lossless-decoding unit 53 will be described with reference to a flowchart shown in FIG. 7. Note that processing showing in FIG. 7 indicates processing for one rectangular region, and is repeatedly executed the number of times equal to the number of rectangular regions. The decoding control unit 73 initializes the lossless-decoding unit 53 (step S61). The initialization processing includes storage of source bitmap data, acquisition of the boundary count E and setting of the remaining boundary count $R_N$ by the boundary input unit 61, clearing of the remaining boundary counts $R_{Lc}$ and $R_{Ln}$ in the continuing boundary queue 62, and initialization of the X-position of the line of interest.

The decoding control unit 73 determines whether the line of interest is the last line of the rectangular region (step S62). If the line of interest is the last line, the decoding processing of the rectangular region ends; otherwise; the decoding control unit 73 executes processing (step S63) (to be described later) of acquiring a succeeding boundary using the boundary input unit 61, continuing boundary queue 62, and boundary-comparison unit 63.

The decoding control unit 73 determines whether the acquired succeeding boundary corresponds to the first boundary on the line of interest (step S64). If the succeeding boundary is the first boundary, a region on the left side of the succeeding boundary is a lossy-compression region. In this case, the decoding control unit 73 processes the left lossy-compression region using the pixel counting unit 67 and pixel selection unit 72 (step S65).

The processing of the left lossy-compression region is processing of calculating the pixel count N2 of the lossy-compression region based on the X-position of the enabling boundary of the succeeding boundary on the line of interest, and outputting, to the write control unit 54, pixel data for the pixel count N2 of the pixel data input by the pixel input unit 71. In other words, pixel data from the left end pixel of the line of interest to a pixel immediately before the enabling boundary is output. Note that if the X-position of the enabling boundary of the first boundary is 0, there is no lossy-compression region on the left side of the lossless-compression region. However, since the pixel count N2 is 0, the processing in step S65 is not substantially executed.

The decoding control unit 73 determines a line end flag (to be described later) (step S66). If the line end flag is true, update of the processing region and continuing boundary queue when the line has ended is performed (step S67). Alternatively, if the line end flag is false, update of the processing region and continuing boundary queue when the line has not ended is performed (step S68). Subsequently, the decoding control unit 73 decodes the lossless-compression region (step S69). The processes in steps S67, S68, and S69 will be described in detail later.

The decoding control unit 73 determines whether the processing region has reached the right end of the line of interest (step S70). If the processing region has not reached the right end of the line of interest, it is determined whether the remaining boundary count $R_{Lc}>0$ for the line of interest (step S71). If the processing region has not reached the right end of the line of interest and the remaining boundary count $R_{Lc}>0$, a lossless-compression region exists on the right side of the processing region, and thus the decoding control unit 73 returns the process to step S63.

If the processing region has not reached the right end of the line of interest, and the remaining boundary count $R_{Lc}=0$, only a lossy-compression region exists on the right side of the processing region. In this case, the decoding control unit 73 processes the right lossy-compression region using the pixel counting unit 67 and pixel selection unit 72 (step S72).

The processing of the right lossy-compression region is processing of calculating the pixel count N2 of the lossy-compression region based on the X-position of the disabling boundary of the succeeding boundary on the line of interest, and outputting, to the write control unit 54, pixel data for the pixel count N2 of the pixel data input by the pixel input unit 71. In other words, pixel data from a pixel immediately after the disabling boundary to the right end pixel on the line of interest is output.

If the processing region reaches the right end of the line of interest or after the processing of the right lossy-compression region is performed, the decoding control unit 73 returns the process to step S62.

Succeeding Boundary Acquisition Processing

Figure 8A:
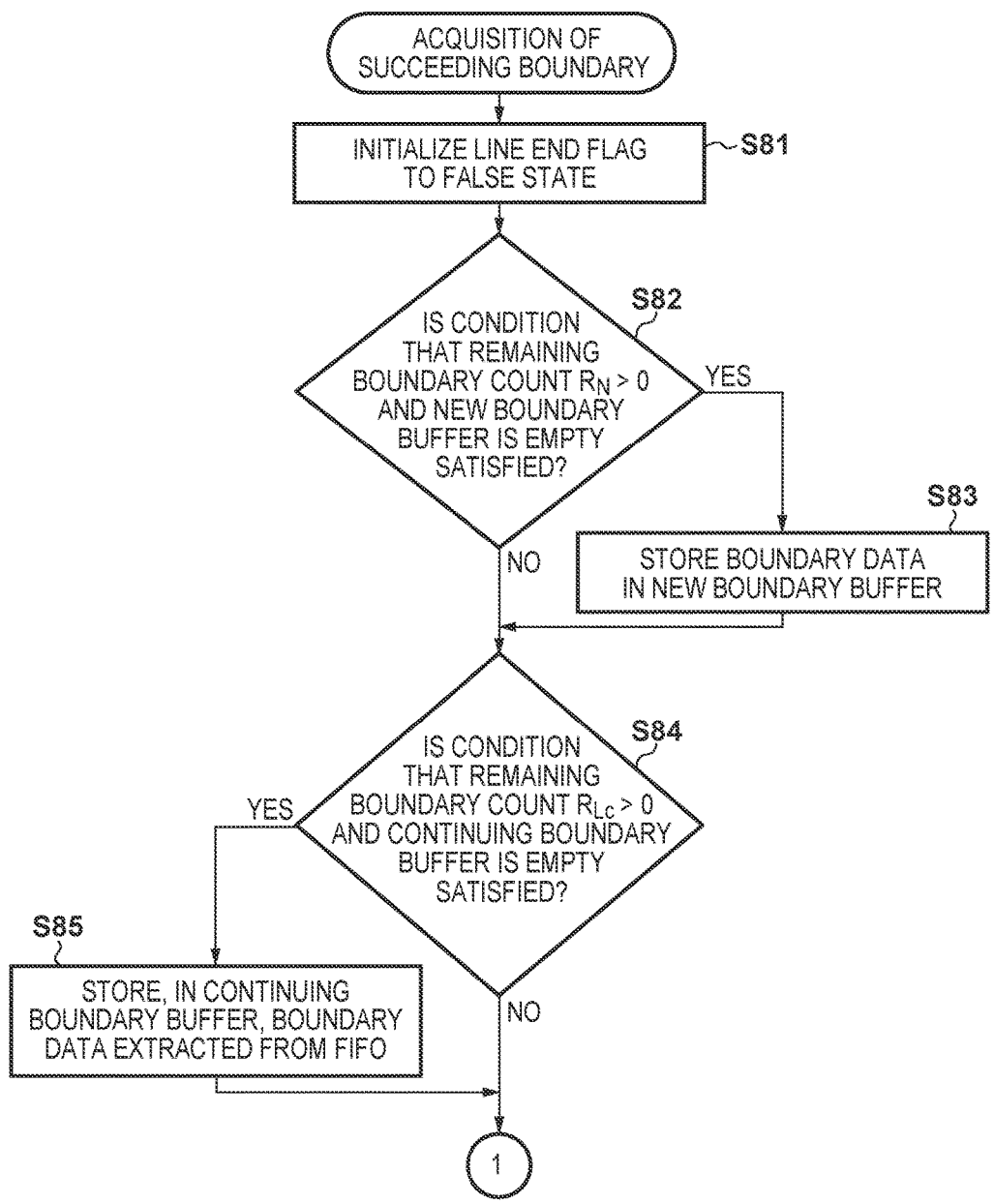
FIGS. 8A and 8B are flowcharts for explaining succeeding boundary acquisition processing.
Figure 8B:
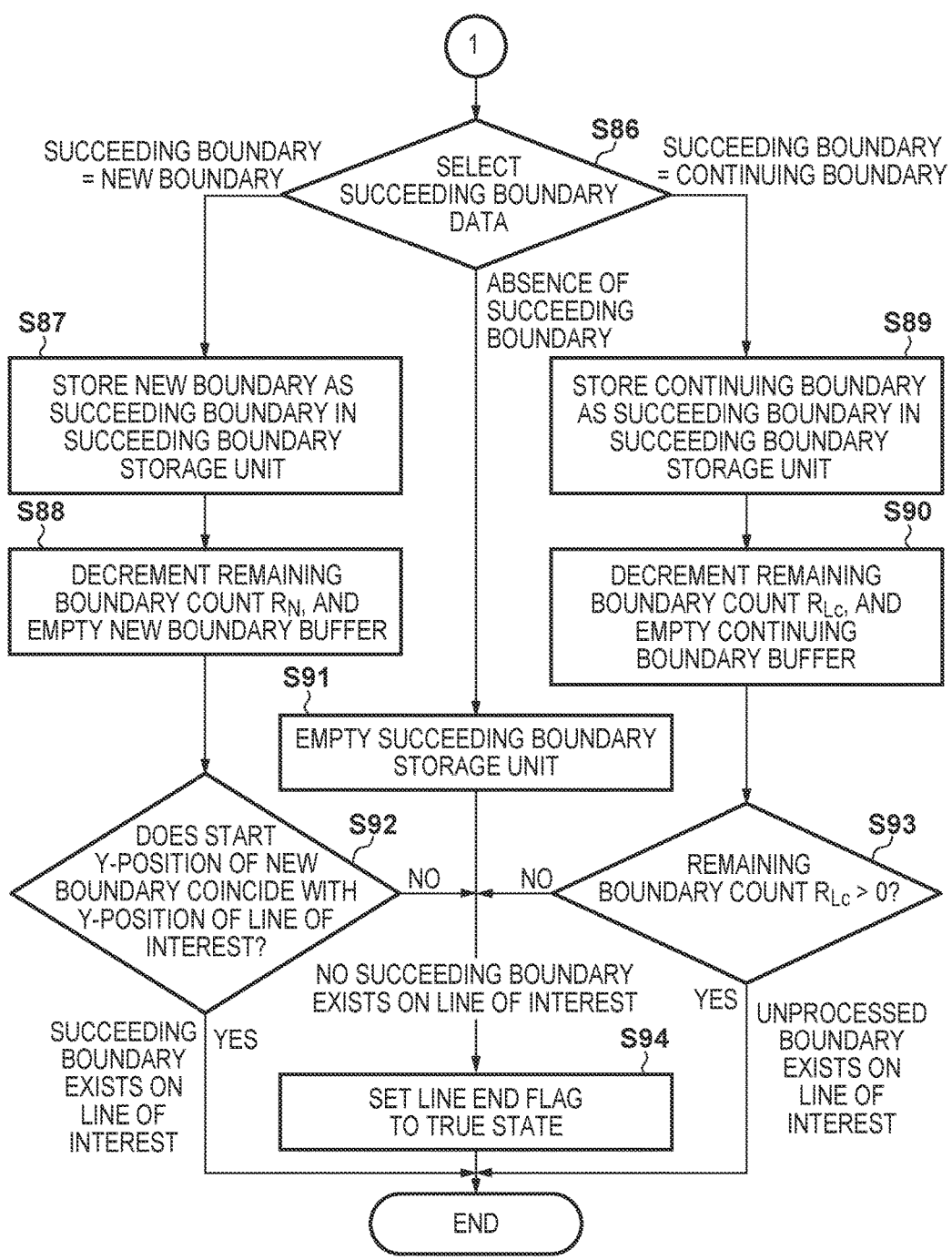

The processing (step S63) of acquiring a succeeding boundary will be described with reference to flowcharts shown in FIGS. 8A and 8B. The decoding control unit 73 initializes the line end flag to a false state (step S81). The boundary input unit 61 determines the remaining boundary count $R_N$ and the state of the new boundary buffer to determine the necessity of acquisition of boundary data (step S82). If the remaining boundary count $R_N>0$ and the new boundary buffer is empty, the boundary input unit 61 acquires the boundary data from the memory 55, and stores the acquired boundary data in the new boundary buffer (step S83).

On the other hand, the continuing boundary queue 62 determines the remaining boundary count $R_{Lc}$ of the line of interest and the state of the continuing boundary buffer to determine the necessity of setting of continuing boundary data (step S84). If the remaining boundary count $R_{Lc}>0$ and the continuing boundary buffer is empty, the boundary data extracted from the FIFO is stored in the continuing boundary buffer (step S85).

The boundary-comparison unit 63 controls the boundary selection unit 64 to select a succeeding boundary (step S86). If the succeeding boundary is equal to the new boundary, the new boundary is selected as a succeeding boundary, and stored in the succeeding boundary storage unit (step S87). "Succeeding boundary=new boundary" indicates a case in which the new boundary buffer is not empty and the continuing boundary buffer is empty or a case in which the X-position of the new boundary is smaller than that of the continuing boundary on the line of interest. In this case, the boundary input unit 61 decrements the remaining boundary count $R_N$, and empties the new boundary buffer (step S88).

If the succeeding boundary is equal to the continuing boundary, the continuing boundary is selected as a succeeding boundary, and stored in the succeeding boundary storage unit (step S89). "Succeeding boundary=continuing boundary" indicates a case in which the continuing boundary buffer is not empty and the new boundary buffer is empty or a case in which the X-position of the continuing boundary is smaller than that of the new boundary on the line of interest. In this case, the continuing boundary queue 62 decrements the remaining boundary count $R_{Lc}$ of the line of interest, and empties the continuing boundary buffer (step S90).

If the new boundary buffer is empty and the continuing boundary buffer is empty, the boundary-comparison unit 63 empties the succeeding boundary storage unit 65 to indicate that no succeeding boundary exists (step S91).

In the case of "succeeding boundary=new boundary", the decoding control unit 73 determines the start Y-position of the new boundary and the Y-position of the line of interest (step S92). If these positions coincide with each other, the succeeding boundary exists on the line of interest and the succeeding boundary acquisition processing ends.

In the case of "succeeding boundary=continuing boundary", the decoding control unit 73 determines the remaining boundary count $R_{Lc}$ (step S93). If the remaining boundary count $R_{Lc}$ is equal to or larger than 1 ($R_{Lc}>0$), an unprocessed boundary exists on the line of interest. In this case, the decoding control unit 73 ends the succeeding boundary acquisition processing. Alternatively, if the remaining boundary count $R_{Lc}$ is 0 ($R_{Lc}=0$), the succeeding boundary is the last boundary on the line of interest.

In one of the following cases, no succeeding boundary exists on the line of interest, and the decoding control unit 73 sets the line end flag to a true state (step S94), thereby ending the succeeding boundary acquisition processing.

A case in which the succeeding boundary storage unit 65 is emptied (step S91)

A case in which the start Y-position of the new boundary≠the Y-position of the line of interest (step S92)

A case in which the remaining boundary count $R_{Lc}$ of the line of interest is 0 (step S93)

Figure 9:
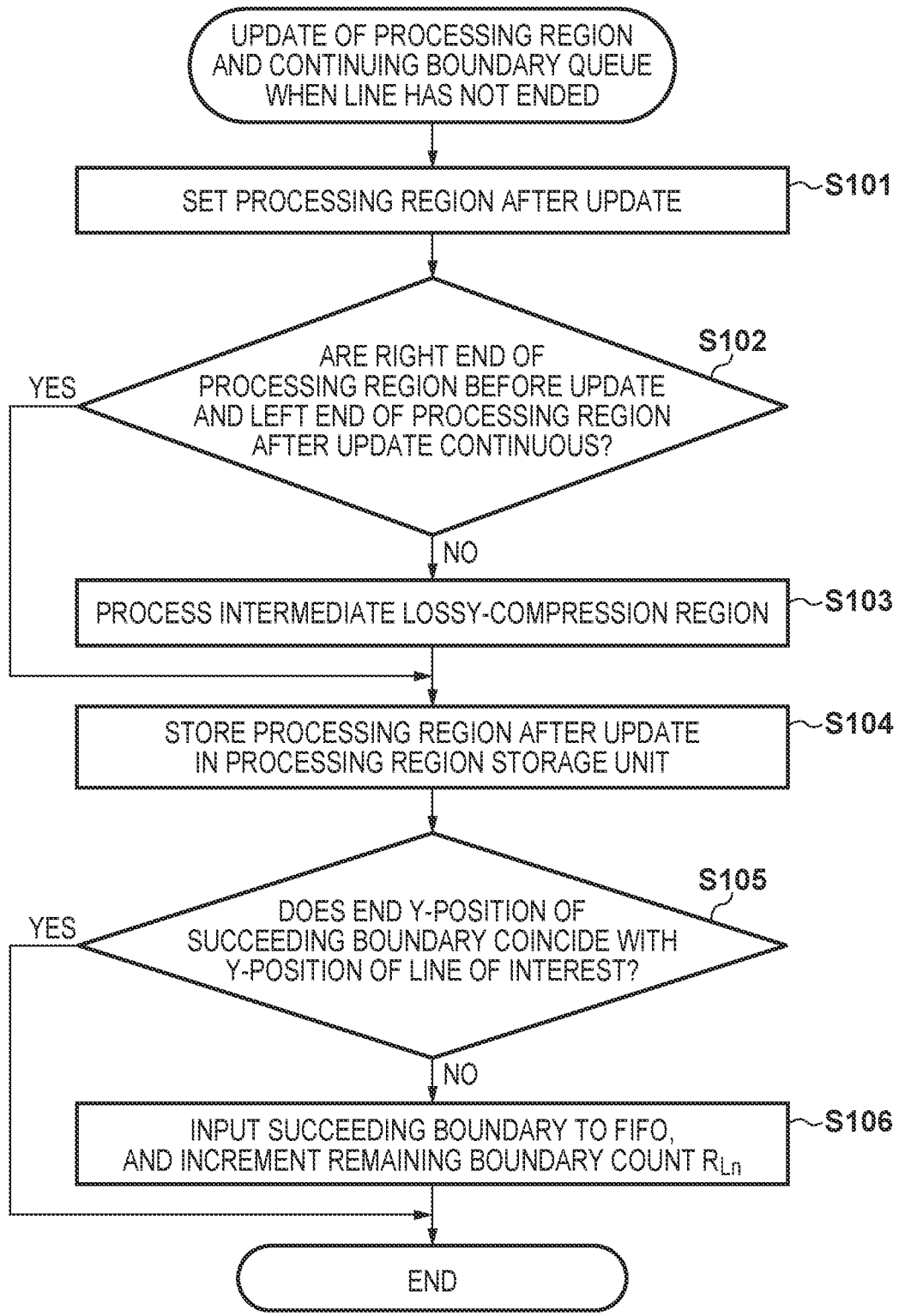
FIG. 9 is a flowchart for explaining update processing of a processing region and continuing boundary queue when a line has not ended.

Update of Processing Region and Continuing Boundary Queue When Line has Not Ended The update processing (step S68) of the processing region and the continuing boundary queue 62 when the line has not ended will be described with reference to a flowchart shown in FIG. 9. The decoding control unit 73 sets, as the processing region after the update, a region from the X-position of the enabling boundary of the succeeding boundary to the X-position of the disabling boundary on the line of interest (step S101).

The decoding control unit 73 determines whether the right end of the processing region before the update stored in the processing region storage unit 66 and the left end of the processing region after the update are continuous (step S102). If the right end and the left end are not continuous, a lossy-compression region exists between the processing region before the update and the processing region after the update. In this case, the decoding control unit 73 processes the intermediate lossy-compression region using the pixel counting unit 67, pixel selection control unit 69, pixel input unit 71, and pixel selection unit 72 (step S103).

The processing of the intermediate lossy-compression region is processing of calculating the pixel count N2 of the lossy-compression region based on the X-positions of the processing regions before and after the update on the line of interest, and outputting, to the write control unit 54, pixel data for the pixel count N2 of the pixel data input by the pixel input unit 71. In other words, pixel data between the processing regions before and after the update is output.

The decoding control unit 73 stores the processing region after the update in the processing region storage unit 66 (step S104), and determines whether the end Y-position of the succeeding boundary coincides with the Y-position of the line of interest (step S105).

If the end Y-position of the succeeding boundary coincides with the Y-position of the line of interest, decoding (step S69) of the next lossless-compression region completes the decoding processing of the succeeding boundary, and thus it is not necessary to hold the succeeding boundary in the continuing boundary queue 62. On the other hand, if the end Y-position of the succeeding boundary does not coincide with the Y-position of the line of interest, it is necessary to hold the succeeding boundary in the continuing boundary queue 62. Therefore, if the end Y-position of the succeeding boundary does not coincide with the Y-position of the line of interest, the decoding control unit 73 inputs the succeeding boundary to the FIFO of the continuing boundary queue 62, and increments the remaining boundary count $R_{Ln}$ of the next line (step S106).

Then, the update processing of the processing region and the continuing boundary queue 62 when the line has not ended ends.

Update of Processing Region and Continuing Boundary Queue When Line has Ended

Figure 10:
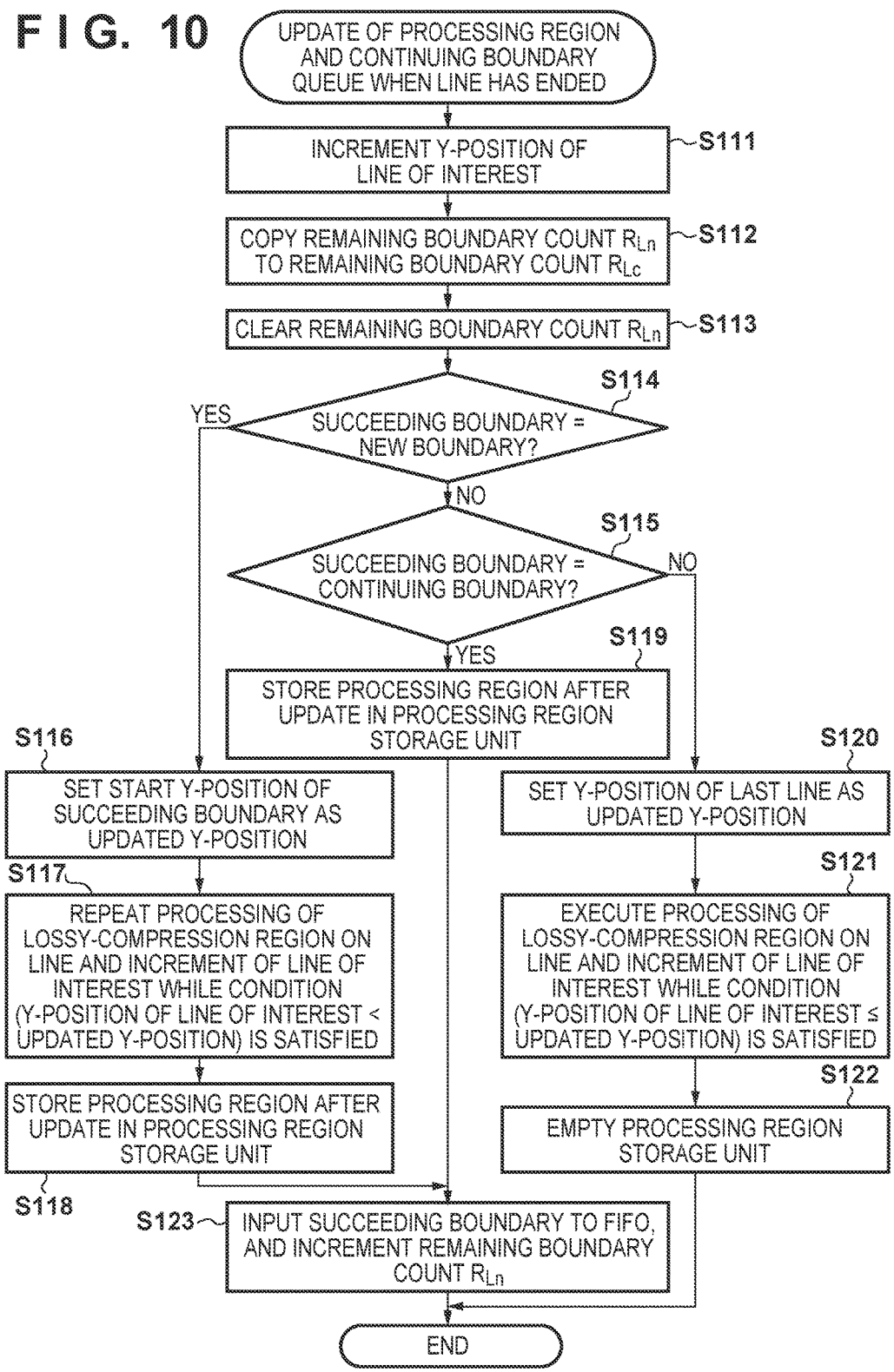
FIG. 10 is a flowchart for explaining the update processing of the processing region and continuing boundary queue when a line has ended.

The update processing (step S67) of the processing region and the continuing boundary queue 62 when the line has ended will be described with reference to a flowchart shown in FIG. 10. The decoding control unit 73 increments the Y-position of the line of interest (step S111), copies the remaining boundary count $R_{Ln}$ of the next line in the continuing boundary queue 62 to the remaining boundary count $R_{Lc}$ of the line of interest (step S112), and clears the remaining boundary count $R_{Ln}$ (step S113).

The decoding control unit 73 determines whether the new boundary has been selected as a succeeding boundary (step S114), and determines whether the continuing boundary has been selected (step S115), thereby branching the process based on the determination results.

In the case of "succeeding boundary=new boundary", no lossless-compression region exists from the line of interest to a line before the start Y-position of the new boundary. In this case, the decoding control unit 73 sets the start Y-position of the succeeding boundary as an updated Y-position (step S116). While the condition (Y-position of line of interest<updated Y-position) is satisfied, the processing of the lossy-compression region on the line and increment of the line of interest are repeated (step S117).

The processing of the lossy-compression region on the line is processing of setting the pixel count N2 of the lossy-compression region as the width of the rectangular region on the line satisfying the condition, and outputting, to the write control unit 54, pixel data for the pixel count N2 of the pixel data input by the pixel input unit 71. In other words, the pixel data of the entire line is output.

The decoding control unit 73 sets, as a processing region after the update, a region from the X-position of the enabling boundary of the succeeding boundary to the X-position of the disabling boundary on the line of interest, and stores the processing region after the update in the processing region storage unit 66 (step S118), thereby advancing the process to step S123.

In the case of "succeeding boundary=continuing boundary", the decoding control unit 73 sets, as a processing region after the update, a region from the X-position of the enabling boundary of the succeeding boundary to the X-position at the right end of the rectangular region on the line of interest, and stores the processing region after the update in the processing region storage unit 66 (step S119), thereby advancing the process to step S123.

If neither the new boundary nor the continuing boundary is selected as a succeeding boundary, or if no succeeding boundary exists, no lossless-compression region exists from the line of interest to the last line of the rectangular region. In this case, the decoding control unit 73 sets the Y-position of the last line as the updated Y-position (step S120). While the condition (Y-position of line of interest≤updated Y-position) is satisfied, the processing of the lossy-compression region on the line and increment of the line of interest are executed (step S121), similarly to step S117. Subsequently, the decoding control unit 73 empties the processing region storage unit 66 (step S122), and ends the update processing of the processing region and the continuing boundary queue 62.

If a succeeding boundary exists, the decoding control unit 73 inputs the succeeding boundary to the FIFO of the continuing boundary queue 62, and increments the remaining boundary count $R_{Ln}$ of the next line (step S123), thereby ending the update processing of the processing region and the continuing boundary queue 62.

Decoding of Lossless-Compression Region

Figure 11:
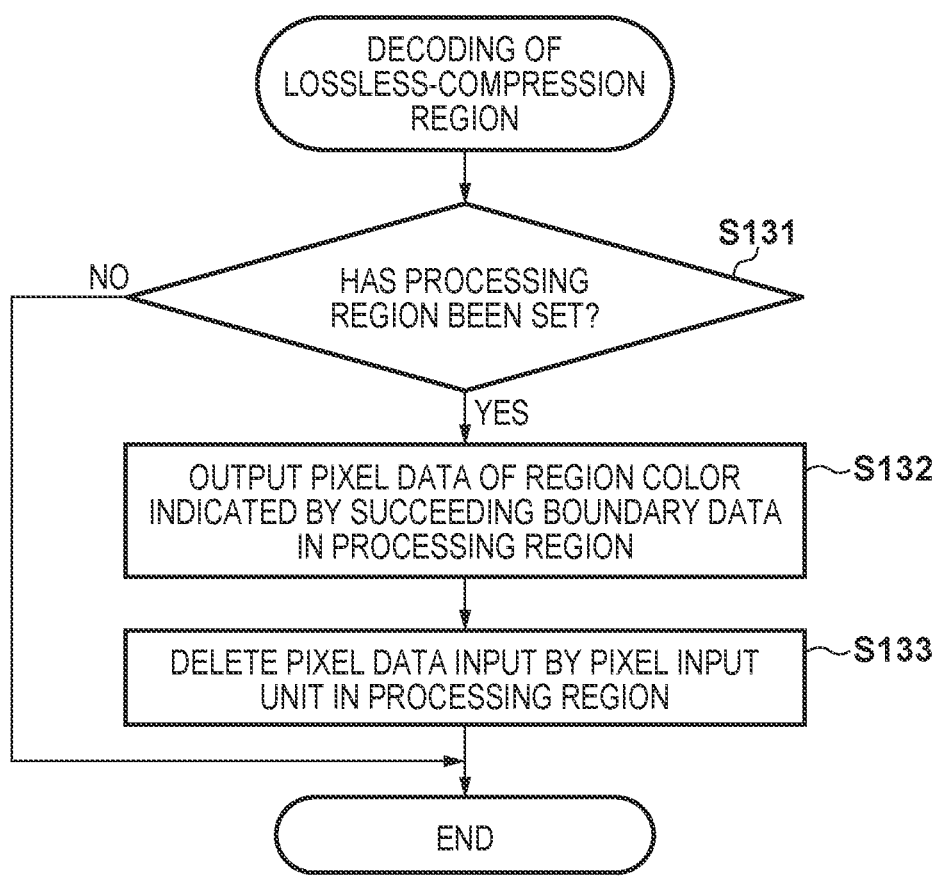
FIG. 11 is a flowchart for explaining the decoding processing of a lossless-compression region.

The decoding processing (step S69) of the lossless-compression region will be described with reference to a flowchart shown in FIG. 11. The decoding control unit 73 determines whether the processing region storage unit 66 is empty (step S131). If the processing region storage unit 66 is empty (no processing region is set), the decoding processing of the lossless-compression region ends.

If a processing region is stored in the processing region storage unit 66, the decoding control unit 73 outputs, to the write control unit 54, the pixel data of a region color indicated by the succeeding boundary in the processing region using the pixel counting unit 67, pixel selection control unit 69, region-color extraction unit 70, and pixel selection unit 72 (step S132). The decoding control unit 73 deletes the pixel data input by the pixel input unit 71 in the processing region (step S133). This decodes the pixel data of the processing region (lossless-compression region) on the line of interest.

Image Decoding Operation

An image decoding operation in a system including the above image decoding apparatus will be described below.

Structure of Bitmap Data

Figures 12A, 12B:
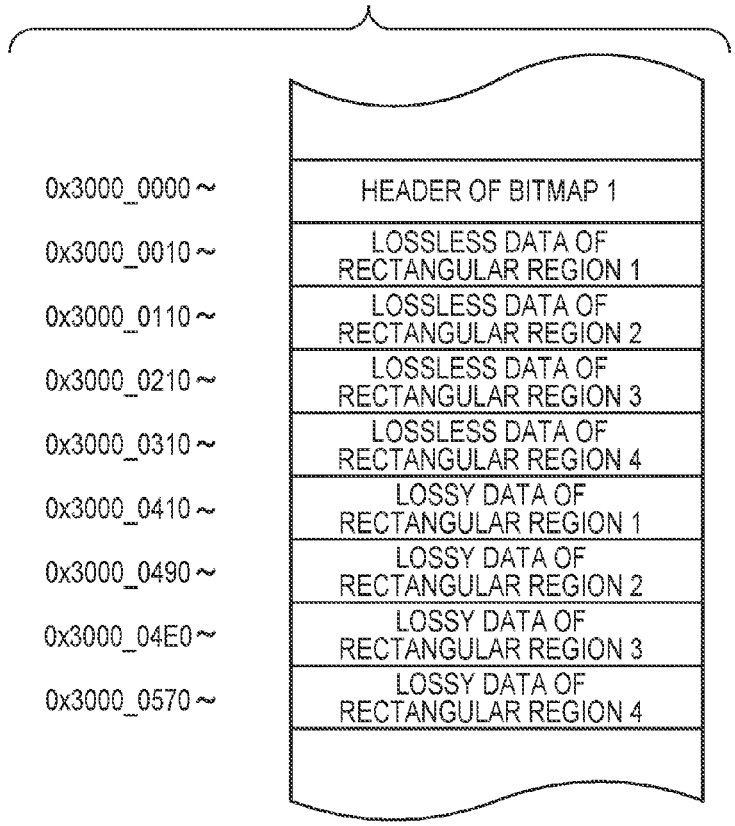
FIGS. 12A and 12B are views showing an example of bitmap data.

FIGS. 12A and 12B show an example of bitmap data. FIG. 12A shows the memory image of the bitmap data. FIG. 12A shows an example of the bitmap data when the bitmap data includes one bitmap 1 and bitmap 1 includes two rectangular regions (rectangular regions 1, 2, 3, and 4) in each of the horizontal and vertical directions. That is, the header of bitmap 1 is stored, and the lossless-compressed data of the rectangular regions and the lossy-compressed data of the rectangular regions are stored after the header.

FIG. 12B shows an example of the structure of the header of bitmap 1. As indicated by a "bitmap size" field, bitmap 1 is formed from two rectangular regions in a horizontal direction W and two rectangular regions in a vertical direction H, that is, four rectangular regions in total. As indicated by a "channel count" field, bitmap 1 has three RGB channels. As indicated by a "bit accuracy" field, each channel has 8 bits.

The pointer map of the lossless-compressed data indicates, from the top, the start address of the lossless-compressed data of rectangular region 1, . . . , the start address of the lossless-compressed data of rectangular region 4. The pointer map of the lossy-compressed data indicates, from the top, the start address of the lossy-compressed data of rectangular region 1, . . . , the start address of the lossy-compressed data of rectangular region 4.

Arrangement of Image Processing Apparatus

Figure 13:
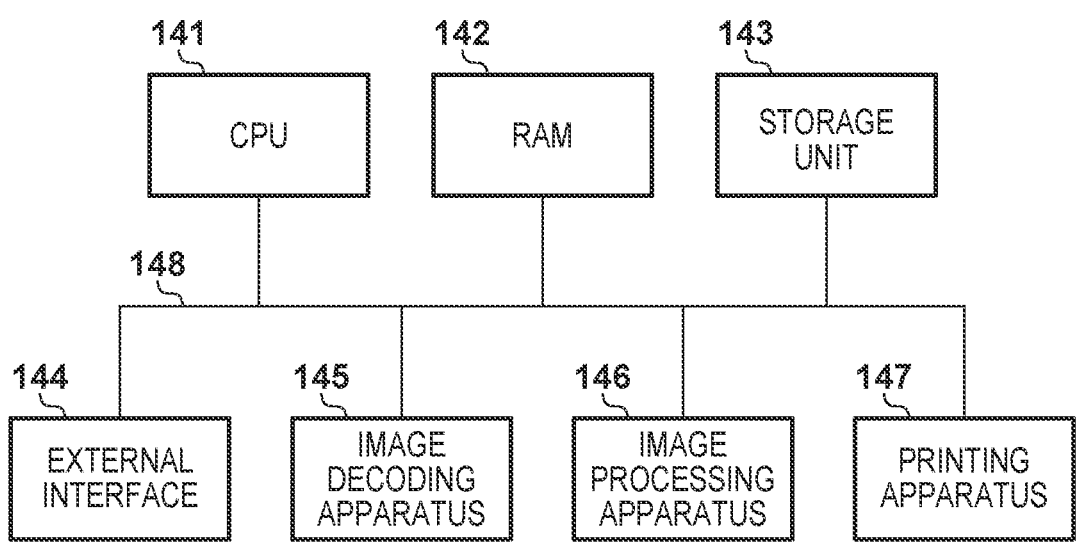
FIG. 13 is a block diagram showing an example of the system arrangement of an image processing apparatus including an image decoding apparatus.

FIG. 13 is a block diagram showing an example of the system arrangement of the image processing apparatus including the above-described image decoding apparatus.

A CPU 141 controls the overall system by executing an OS and various programs stored in a storage unit 143 including a ROM and flash memory using a RAM 142 as a work memory. An external interface (external I/F) 144 is a communication interface such as a USB card for connection to an external apparatus (for example, an information processing apparatus or scanner) or an Ethernet® card for connection to a network.

An image decoding apparatus 145 is the above-described image decoding apparatus, and performs the decoding processing of encoded and compressed image data input via the external I/F 144. An image processing apparatus 146 performs, for example, processing of improving the image quality of the image data decoded by the image decoding apparatus 145, and image processing of, for example, converting the image data into the input data format of a printing apparatus 147. The printing apparatus 147 forms an image on a printing medium using a printing material (toner or ink) based on the input image data.

An interconnect 148 is a data transfer line formed by a common bus, switches, and the like between the CPU 141, RAM 142, storage unit 143, external I/F 144, image decoding apparatus 145, image processing apparatus 146, and printing apparatus 147.

The external I/F 144 receives source bitmap data from an information processing apparatus or print server (neither of which is shown) via a serial bus or network. The external I/F 144 notifies, by an interrupt signal or the like, the CPU 141 that it has received the data. The CPU 141 controls the external I/F 144 to transfer the source bitmap data to the RAM 142. FIG. 12A shows the memory image of the source bitmap data stored in the RAM 142.

The CPU 141 notifies the image decoding apparatus 145 of a decoding instruction and the start address 0x3000_0000 of the source bitmap data. As a decoding instruction notification method, there is known a method in which the image decoding apparatus 145 includes a control register for receiving the address of the source bitmap data and the decoding instruction and the CPU 141 writes the address of the source bitmap data and the decoding instruction in the control register. The CPU 141 notifies the image decoding apparatus 145 of the start address of the buffer in which the decoding data is to be written.

Upon receiving the decoding instruction, the control unit 51 (shown in FIG. 5) of the image decoding apparatus 145 inputs the header of bitmap 1 from the address 0x3000_0000, and recognizes the existence of the four rectangular regions based on the bitmap size (W, H). The control unit 51 notifies the lossy-decoding unit 52, lossless-decoding unit 53, and write control unit 54 of the rectangular region count "4", the channel count "3", and the bit accuracy "8". This notification sets the lossy-decoding unit 52, lossless-decoding unit 53, and write control unit 54 to transfer a decoding result using three channels each having 8 bits.

The control unit 51 reads out the pointer of the lossless data of rectangular region 1 from the pointer map of the lossless-compressed data shown in FIG. 2, and transfers the pointer to the lossless-decoding unit 53. Furthermore, the control unit 51 reads out the pointer of the lossy data of rectangular region 1 from the pointer map of the lossy-compressed data, and transfers the pointer to the lossy-decoding unit 52.

The lossy-decoding unit 52 reads out the lossy data from an address 0x3000_0410 indicated by the pointer, decodes the data, and transfers pixel data of a decoding result to the lossless-decoding unit 53 in the line order (ascending order of the Y-position) and in ascending order of the X-position.

The lossless-decoding unit 53 reads out lossless data from an address 0x3000_0010 indicated by the pointer, decodes the data, and transfers pixel data of a decoding result to the write control unit 54 in the line order (ascending order of the Y-position) and in ascending order of the X-position.

As described above, in the rectangular region in which the lossy-compression region and the lossless-compression region coexist to sandwich an arbitrary boundary, the decompression result of the lossy-compressed data or the lossless-compressed data is output in the raster order with reference to the boundary information. Therefore, it is possible to obtain encoded and compressed image data of the rectangular region without storing all the decompression results of the lossy-compressed data and overwriting the lossless-compression regions by the decompression results of the lossless-compressed data. In other words, the pixel data transferred to the RAM 142 via the interconnect 148 is the pixel data of the lossy-compression region decoded from the lossy-compressed data and/or the pixel data of the lossless-compression region decoded from the lossless-compressed data. That is, it becomes unnecessary to transfer the pixel data of the lossless-compression region decoded from the lossy-compressed data via the interconnect 148, thereby making it possible to prevent the system bus band and memory band from being wastefully consumed.

Modification

Figure 15:
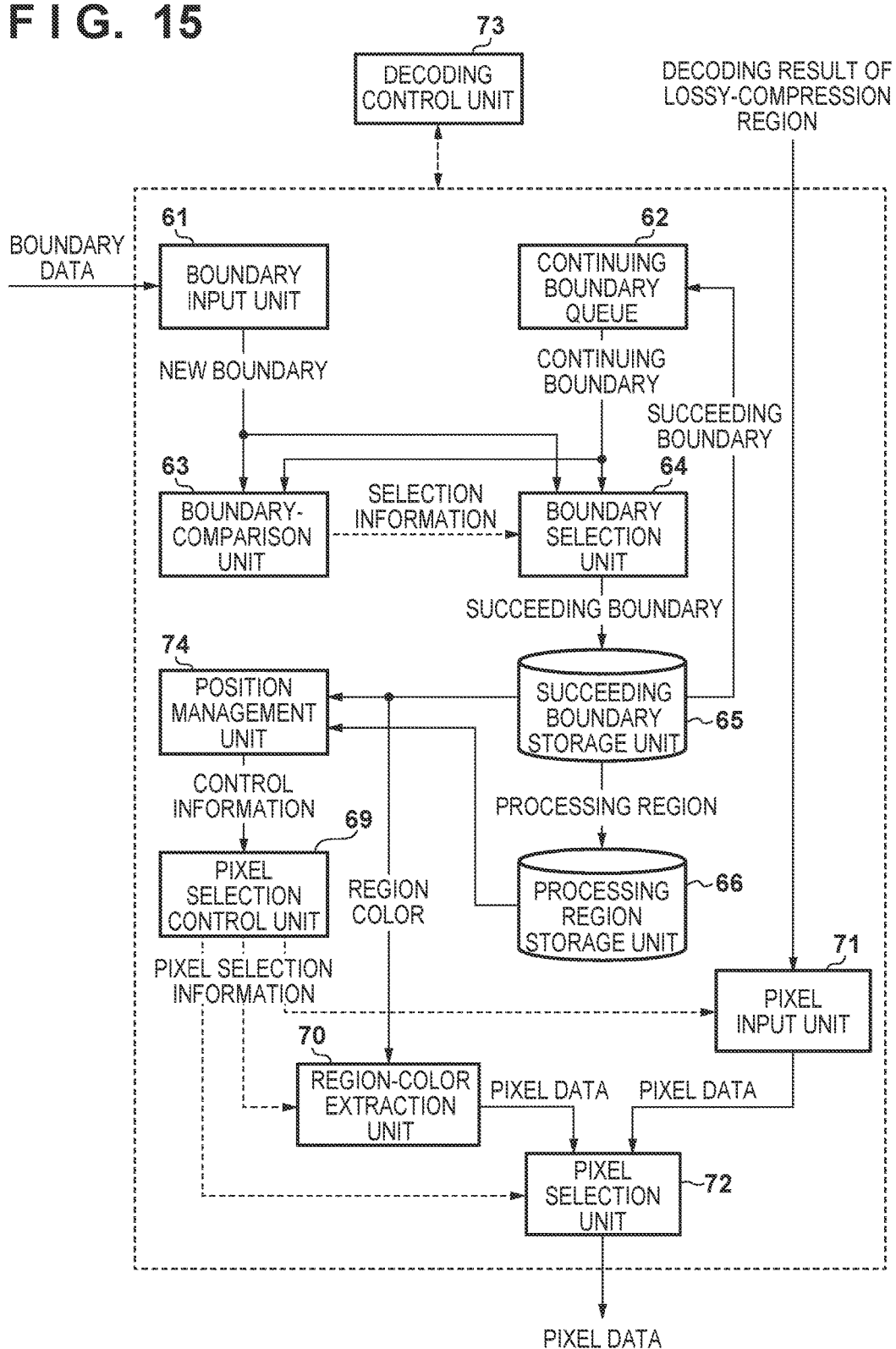
FIG. 15 is a block diagram showing a modification of the image decoding apparatus.

FIG. 15 is a block diagram showing a modification of the image decoding apparatus. The image decoding apparatus shown in FIG. 15 includes a position management unit 74 instead of the pixel counting unit 67. The position management unit 74 manages the position of a pixel currently decoded in bitmap data, and generates control information indicating whether the position of the pixel belongs to a lossless-compression region having an enabling boundary at the right end or a lossy-compression region having a disabling boundary at the right end. That is, the determination processing is performed for each pixel.

The position management unit 74 successively counts up from the origin position (0, 0) of bitmap data (H and W respectively represent pixel counts in the horizontal and vertical directions) to be decoded up to a position (W−1, H−1). That is, the position management unit 74 counts up the position in the main scanning line direction, and counts up the position in the sub-scanning line direction when the position reaches the right end, like (0, 0), . . . , (W−1, 0), (0, 1), . . . , (W−1, 1), . . . , (0, H−1), . . . , (W−1, H−1). That is, the position management unit 74 generates data indicating the position in the raster scan order. The position management unit 74 always generates control information for processing one pixel with respect to the pixel selection control unit 69.

Second Embodiment

An image decoding apparatus and image decoding method according to the second embodiment of the present invention will be described below. Note that in the second embodiment, the same reference numerals as in the first embodiment denote almost the same components, and a detailed description thereof may be omitted.

FIG. 16 is a block diagram showing an example of the arrangement of an image processing apparatus including a rendering system to which an image decoding apparatus is applied according to the second embodiment. The same reference numerals as those shown in FIG. 13 denote almost the same components and a detailed description thereof will be omitted.

The rendering system shown in FIG. 16 converts print data described in a page description language (PDL) into intermediate data, performs rendering based on the intermediate data, and generates bitmap data. Print data includes one or more drawing objects, and the drawing objects include text, graphics, and a bitmap image.

An intermediate data generation unit 151 is implemented as software executed by a CPU 141, and converts print data read out from a RAM 142 into intermediate data and writes it in the RAM 142. The generated intermediate data includes renderer control information, boundary information, filling information, and combining (blend) information of each drawing object, and a bitmap image. The bitmap image included in the intermediate data is encoded and compressed in many cases.

A renderer control unit 152 controls a renderer 155 based on the renderer control information included in the intermediate data. The renderer control unit 152 has the function of a control unit 51 of the image decoding apparatus, and outputs the control information to a drawing object processing unit 153 and a renderer write control unit 154.

The drawing object processing unit 153 inputs the boundary information, filling information, and combining information of the drawing object included in the intermediate data, generates pixel data forming a page, and outputs the generated pixel data to the renderer write control unit 154. If the drawing object is a bitmap image, the drawing object processing unit 153 inputs the bitmap image from the RAM 142 based on the control information, and combines pixels of graphics and text with the bitmap image which has undergone interpolation processing, as needed.

The renderer write control unit 154 writes the pixel data input from the drawing object processing unit 153 at a predetermined address in the RAM 142.

The renderer 155 is formed by an image decoding unit and an intermediate data processing unit. The image decoding unit is formed by the renderer control unit 152, a lossy-decoding unit 52, a lossless-decoding unit 53, and a write control unit 54. The intermediate data processing unit is formed by the renderer control unit 152, the drawing object processing unit 153, and the renderer write control unit 154. As described above, the renderer control unit 152 is the component of the image decoding unit and the intermediate data processing unit.

If the intermediate data includes encoded and compressed image data, the renderer control unit 152 outputs the decoding control information of the compressed and encoded image data to the image decoding unit in accordance with the render control information of the intermediate data. The image decoding unit decodes the encoded and compressed bitmap image, and writes the decoding result in the RAM 142, as described in the first embodiment.

Next, the renderer control unit 152 outputs the control information to the intermediate data processing unit in accordance with the renderer control information of the intermediate data. The drawing object processing unit 153 inputs the bitmap image which has been decoded by the image decoding unit and written in the RAM 142, and combines the pixel data of another drawing object with the bitmap image.

The drawing object processing unit 153 outputs, to the renderer write control unit 154, each pixel data obtained by the combining processing. The renderer write control unit 154 writes the pixel data at a predetermined address in the RAM 142. The above rendering processing converts the print data into bitmap data, and stores the converted data in the RAM 142.

Note that the lossy-decoding unit 52 can be implemented by software processing in which a processor provided separately from the CPU and including a dedicated work memory reads out a program from a dedicated program memory or a common system memory, and executes it. The lossless-decoding unit 53 can also be implemented by a circuit for implementing the same function. Furthermore, both the lossy-decoding unit 52 and the lossless-decoding unit 53 may be processors or dedicated circuits.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-115036, filed Jun. 5, 2015, and 2016-077580, filed Apr. 7, 2016, which are hereby incorporated by reference wherein in their entirety.

What is claimed is:

1. An image decoding apparatus for decoding data in which first data obtained by compressing an image for each region by a first method and second data obtained by compressing some regions of the image by a second method different from the first method coexist, and outputting the image, the apparatus comprising:
    a first decoding unit configured to decode the first data and output pixel data of each pixel forming the image;
    a second decoding unit configured to decode the second data of a compression region based on boundary information indicating the compression region compressed by the second method; and
    a write unit configured to write, in a memory, pixel data of each pixel forming the image obtained from the second decoding unit,
    wherein the first decoding unit outputs the pixel data of each pixel to the second decoding unit, and
    the second decoding unit determines, based on the boundary information, whether a processing target pixel is included in the compression region, and
    outputs, for a pixel outside the compression region, the pixel data acquired from the first decoding unit to the write unit, and outputs, for a pixel included in the compression region, the pixel data obtained by decoding by the second decoding unit to the write unit.

2. The apparatus according to claim 1, wherein of the pixel data obtained from the first decoding unit, the pixel data of the pixel included in the compression region is not stored in the memory.

3. The apparatus according to claim 1, wherein the write unit writes the pixel data in the memory once for each pixel forming the image.

4. The apparatus according to claim 1, wherein the second decoding unit includes
    an acquisition unit configured to acquire the boundary information as new boundary information,
    a holding unit configured to hold the boundary information as continuing boundary information,
    a selection unit configured to select one of the new boundary information and the continuing boundary information as succeeding boundary information indicating the succeeding compression region, and a control unit configured to input the succeeding boundary information to the holding unit, and perform decoding of the second image data of the compression region and selection of the pixel data based on the succeeding boundary information.

5. The apparatus according to claim 4, wherein
the boundary information includes, for each line, enabling information indicating a left end of the compression region and disabling information indicating a right end of the compression region, and
the control unit performs, for each line, decoding of the second image data of the compression region and selection of the pixel data based on the enabling information and the disabling information which are indicated by the succeeding boundary information.

6. The apparatus according to claim 5, wherein
the boundary information further includes color information of the compression region, and
as decoding of the second image data of the compression region, the control unit outputs the color information as the pixel data from a position of a pixel indicated by the enabling information and a position of a pixel indicated the disabling information.

7. The apparatus according to claim 4, wherein the holding unit includes a first counter for managing the number of inputs of the pieces of succeeding boundary information, and a second counter for managing the number of pieces of continuing boundary information with respect to a line of interest.

8. The apparatus according to claim 7, wherein the holding unit outputs the pieces of continuing boundary information in an input order, and decrements the second counter when the continuing boundary information is selected as the succeeding boundary information.

9. The apparatus according to claim 8, wherein in one of a first case in which the new boundary information is selected as the succeeding boundary information and a start line of the compression region indicated by the new boundary information does not coincide with the line of interest, a second case in which the continuing boundary information is selected as the succeeding boundary information and the second counter indicates 0, and a third case in which there is no boundary information to be selected as the succeeding boundary information, the holding unit copies information of the first counter to the second counter, and clears the first counter, and the control unit increments a position of the line of interest.

10. The apparatus according to claim 9, wherein in the first case, while the position of the line of interest do not reach the start line of the compression region indicated by the succeeding boundary information, the control unit repeats increment of the position of the line of interest and selection of the pixel data decoded by the first decoding unit.

11. The apparatus according to claim 9, wherein in the third case, the control unit repeats increment of the position of the line of interest and selection of the pixel data decoded by the first decoding unit until the position of the line of interest reaches a position of a last line of the image data.

12. The apparatus according to claim 4, wherein the acquisition unit includes a third counter configured to acquire the number of compression regions included in the image data and manage the remaining number of compression regions, and decrements the third counter when the new boundary information is selected as the succeeding boundary information.

13. The apparatus according to claim 12, wherein if the third counter indicates the existence of the compression region after the decrement, the acquisition unit acquires the new boundary information.

14. The apparatus according to claim 1, wherein the first method is a lossy-compression method, and the second method is a lossless-compression method.

15. The apparatus according to claim 4, wherein the second decoding unit selects the first image data based on the two consecutive pieces of boundary information.

16. The apparatus according to claim 15, wherein in the region where the second image data is selected, the first image data is discarded.

17. The apparatus according to claim 1, further comprising:
a rendering unit configured to render an image using data written by the write unit.

18. The apparatus according to claim 1, wherein the first decoding unit is formed by dedicated hardware, the second decoding unit is formed by a processor including a dedicated work memory, and the processor executes a program to function as the second decoding unit.

19. A control method for an image decoding apparatus for decoding data in which first data obtained by compressing an image for each region by a first method and second data obtained by compressing some regions of the image by a second method different from the first method coexist, and outputting the image, the method comprising:
decoding the first data and outputting pixel data of each pixel forming the image;
decoding the second data of a compression region based on boundary information indicating the compression region compressed by the second method; and
writing, in a memory, pixel data of each pixel forming the image obtained in the decoding the second data,
wherein the pixel data of each pixel obtained in the decoding the first data is transferred to decoding processing of the second data, and
wherein in the decoding the second data,
it is determined, based on the boundary information, whether a processing target pixel is included in the compression region, and
the pixel data obtained in the decoding the first data is output as a write target for a pixel outside the compression region, and the pixel data obtained in the decoding the second data is output as a write target for a pixel included in the compression region.

20. A non-transitory computer-readable storage medium storing a program which causes a computer to perform an image decoding method of decoding data in which first data compressed by a first method and second data compressed by a second method different from the first method coexist, and outputting an image, the method comprising:
decoding the first data and outputting pixel data of each pixel forming the image;
decoding the second data of a compression region based on boundary information indicating the compression region compressed by the second method; and
writing, in a memory, pixel data of each pixel forming the image obtained in the decoding the second data,
wherein the pixel data of each pixel obtained in the decoding the first data is transferred to decoding processing of the second data, and
wherein in the decoding the second decoding,
it is determined, based on the boundary information, whether a processing target pixel is included in the compression region, and the pixel data obtained in the decoding the first data is output as a write target for a pixel outside the compression region, and the pixel data obtained in the decoding the second data is output as a write target for a pixel included in the compression region.

21. An image decoding apparatus for decoding encoded image data in which lossy-encoded data and lossless-encoded data coexist, where each of the lossy-encoded data and the lossless-encoded data is encoded data of a pixel block of a predetermined size, and the lossless-encoded data is represented by information indicating a nonlinear boundary of a region formed by pixels of a single color within the pixel block and information indicating the single color within the region, the image decoding apparatus comprising:

a first decoding unit configured to decode lossy-encoded data of a pixel block of interest from the encoded image data;

a second decoding unit configured to decode each single-color region included in the pixel block of interest from the lossless-encoded data of the encoded image data; and a write unit configured to write, in a predetermined image memory, one of pixel data obtained by the first decoding unit and pixel data obtained by the second decoding unit as a pixel of a decoding result of the pixel block of interest in a raster order, wherein if a position of a pixel to be written is included in one of the single-color regions decoded by the second decoding unit, the write unit writes the pixel data obtained by the second decoding unit in the image memory; otherwise, the write unit writes the pixel data obtained by the first decoding unit in the image memory.

* * * * *